US012775735B1

(12) United States Patent
Ahuja et al.

(10) Patent No.: US 12,775,735 B1
(45) Date of Patent: Oct. 27, 2026

(54) METHOD AND SYSTEM FOR INTELLIGENT TRANSFORMATION USING DATA PRODUCTION EXPERIENCE (DPX)

(71) Applicant: Government Employees Insurance Company (GEICO), Bethesda, MD (US)

(72) Inventors: Sunil Ahuja, Ellicott City, MD (US); Cian Bell, Alexandria, VA (US); Edward Chang, Sugar Land, TX (US); Chandiprasad Chintalapati, Brookfield, WI (US); Seok Jin Choi, Eugene, OR (US); Fernando Enrique Colman, Addison, TX (US); Nageen Gandikota, Rockville, MD (US); Siddharth Ganti, Dallas, TX (US); Veeraswamy Gatta, Austin, TX (US); Pam Sirithan Kitsuwan, Orlando, FL (US); Kevin Liu, Houston, TX (US); Jingyou Ma, Seattle, WA (US); Anjana Manikandan, Edison, NJ (US); Amit Mittal, Charlotte, NC (US); Vinay Pasupuleti, Prosper, TX (US); Akash Patel, Charlotte, NC (US); Arivumani Ramalingam, Falls Church, VA (US); Sai Selvaganesan, Sunnyvale, CA (US); Hassan Tariq, Silver Spring, MD (US); Taylor James Tarleton, Metairie, LA (US); Venkata Raman Tondepu, Milpitas, CA (US)

(73) Assignee: Government Employees Insurance Company (GEICO), Fredericksburg, VA (US)

( * ) Notice: Subject to any disclaimer, the term of this patent is extended or adjusted under 35 U.S.C. 154(b) by 0 days.

(21) Appl. No.: 19/418,662

(22) Filed: Dec. 12, 2025

(51) Int. Cl.
*G06F 21/62* (2013.01)
*G06F 16/25* (2019.01)

(52) U.S. Cl.
CPC ........ *G06F 21/6227* (2013.01); *G06F 16/258* (2019.01)

(58) Field of Classification Search
CPC ........................... G06F 21/6227; G06F 16/258
See application file for complete search history.

(56) References Cited

U.S. PATENT DOCUMENTS 10,776,357 B2 * 9/2020 Budhiraja ......... G06F 16/24544
11,956,245 B1 * 4/2024 Bhatt ....................... G06N 5/04
(Continued)

FOREIGN PATENT DOCUMENTS

EP 3594822 A1 1/2020

*Primary Examiner* — J. Brant Murphy
(74) *Attorney, Agent, or Firm* — Buchanan Ingersoll & Rooney PC

(57) ABSTRACT

An intelligent data transformation system is disclosed for intelligent transformation of data received from diverse computing platforms into a homogenized data architecture which can be accessed by a user and/or enterprise functions/operations. The intelligent data transformation system can include a user interface including one or more application programming interfaces (APIs), the user interface configured to receive plural data source inputs including one or more security credentials and one or more sample datasets, and manage movement of data from the plural data source inputs within the intelligent data transformation system. A data production experience (DPX) core engine is configured to perform intelligent data transformation, the DPX core engine including a pipeline orchestration engine configured to interface with the APIs to coordinate data movement workflow from the plural data source inputs along a data pipeline.

30 Claims, 11 Drawing Sheets

(56) References Cited

U.S. PATENT DOCUMENTS

| | | | | |
|---|---|---|---|---|
| 2008/0082569 | A1* | 4/2008 | Mansour | G06Q 10/10 |
| | | | | 707/999.102 |
| 2020/0090795 | A1* | 3/2020 | Chang | G06F 21/552 |
| 2020/0241769 | A1* | 7/2020 | Dain | G06F 3/0623 |
| 2025/0258954 | A1* | 8/2025 | Frohnapple | G06F 21/6245 |
| 2025/0322143 | A1* | 10/2025 | Hunter | H04N 21/8456 |
| 2025/0350298 | A1* | 11/2025 | Cooper | H03M 7/3079 |

* cited by examiner

METHOD AND SYSTEM FOR INTELLIGENT TRANSFORMATION USING DATA PRODUCTION EXPERIENCE (DPX)

FIELD

The present disclosure relates to a system for intelligent transformation of data received from diverse computing platforms into a homogenized data architecture.

BACKGROUND

Enterprise organizations manage data across multiple heterogeneous systems, including various databases, cloud storage platforms, streaming systems, and external application programming interfaces (APIs). This data is commonly moved to modern data architectures such as data storage facilities utilizing open table formats such as Apache Iceberg, and cloud data warehouses such as Snowflake, to support analytics, reporting, and artificial intelligence/machine learning (AI/ML) workloads. Moving data between these systems involves significant technical expertise, manual coding, and complex integration work.

US20080082569A1 published 3 Apr. 2008 relates to a smart integration engine and metadata-oriented architecture, the disclosure of which is hereby incorporated by reference in its entirety. EP3594822A1 published on 15 Jan. 2020 relates to an intelligent data ingestion system and method for governance and security, the disclosure of which is hereby incorporated by reference in its entirety.

Known data movement solutions involve data engineers performing some or all of the following:

1. Manually write code for each data source integration
2. Understand specific technical details of diverse processing engines (e.g., Spark, Flink, Airbyte and so forth)
3. Manually manage schema definitions and transformations
4. Obtain and configure individual access permissions and authentications
5. Manually coordinate security operations (e.g., encryption, masking, decryption and so forth)
6. Write custom code for data quality validation and balance controls
7. Manually manage data governance and lineage tracking
8. Create and maintain complex transformation pipelines for complex nested data structures These individual, complex, inter-related processes are time-consuming, error-prone, and involve specialized technical knowledge that can severely impact data movement capabilities to a small subset of technically savvy users within an organization. Such limitations can detrimentally impact business users from moving data independently, and result in significant bottlenecks in data operations across an enterprise. Such complex problems have no current, seamless integrated solutions.

There is a need for a fully integrated intelligent data platform that can automatically determine data contracts and schemas from external platforms, automatically select appropriate processing engines based on data characteristics, automatically coordinate security operations, automatically manage data quality and balance controls, and automatically generate code for data movement without current bottlenecks associated with individualized tasks. Such individualized tasks include writing individual programs or managing technical integrations and lack the ability to integrate tasks across the enterprise so that a holistic enterprise efficiency can be achieved, with enhanced cross-task oversights.

SUMMARY

An exemplary embodiment as disclosed is an intelligent data transformation system for intelligent transformation of data received from diverse computing platforms into a homogenized data architecture, the system comprising: one or more hardware processors; and one or more memories, coupled to the hardware processors; wherein the one or more hardware processors are configured to implement: a user interface including one or more application programming interfaces (APIs), the user interface configured to: receive plural data source inputs including one or more security credentials and one or more sample datasets, and manage movement of data from the plural data source inputs within the intelligent data transformation system; a data production experience (DPX) core engine configured to perform intelligent data transformation, the DPX core engine including a pipeline orchestration engine configured to interface with the APIs to coordinate data movement workflow from the plural data source inputs along a data pipeline; engine selection logic configured to select a processing engine from a plurality of processing engines based on one or more characteristics of at least some data in the data pipeline characterizing a data source from which the at least some data was received, wherein selection of a processing engine is based at least in part on intelligent data analysis; a metadata integration schema engine (MINT) configured to selectively interact with the data pipeline to infer a schema of metadata when metadata is present in the data pipeline; and a data flattening platform connected to the data pipeline and configured to: receive and process data from a selected processing engine and from the MINT to generate computer code that when executed will produce flattened data, wherein the flattened data is based on at least one or more parent-child relationships of hierarchical data structures within the input data identified using intelligent data transformation; execute the computer code to produce the flattened data, and store the flattened data in a homogenized data architecture accessible by the user interface.

An exemplary method is disclosed for intelligent data transformation, the method comprising: receiving, via a user interface including one or more application programming interfaces (APIs), plural data source inputs including one or more security credentials and one or more sample datasets; managing, via the user interface, movement of the plural data source inputs; coordinating data movement workflow from the plural data source inputs along a data pipeline using a pipeline orchestration engine located within a data production experience (DPX) core engine; selecting a processing engine from a plurality of processing engines based on one or more characteristics of at least some data in the data pipeline characterizing a data source from which the at least some data was received, wherein selection of a processing engine is based at least in part on an intelligent data analysis; interacting with the data pipeline using a metadata integration schema engine (MINT) to infer a data format of metadata when metadata is present in the data pipeline; generating computer code that when executed will flatten data received from the MINT via a data flattening platform to produce flattened data by identifying at least one or more parent-child relationships of hierarchical data structures within the input data using intelligent data transformation; executing the computer code to produce the flattened data;

and storing the flattened data in a homogenized data architecture accessible by the user interface.

A exemplary non-transitory computer-readable medium is disclosed for storing computer-executable instructions that, when executed by one or more processors, cause the one or more processors to perform operations comprising: receiving, via a user interface including one or more application programming interfaces (APIs), plural data source inputs including one or more security credentials and one or more sample datasets; managing, via the user interface, movement of the plural data source inputs; coordinating data movement workflow from the plural data source inputs along a data pipeline using a pipeline orchestration engine located within a data production experience (DPX) core engine; selecting a processing engine from a plurality of processing engines based on one or more characteristics of at least some data in the data pipeline characterizing a data source from which the at least some data was received, wherein selection of a processing engine is based at least in part on an intelligent data analysis; interacting with the data pipeline using a metadata integration schema engine (MINT) to infer a data format of metadata when metadata is present in the data pipeline; generating computer code that when executed will flatten data received from the MINT via a data flattening platform to produce flattened data by identifying at least one or more parent-child relationships of hierarchical data structures within the input data using intelligent data transformation; executing the computer code to produce the flattened data; and storing the flattened data in a homogenized data architecture accessible by the user interface.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
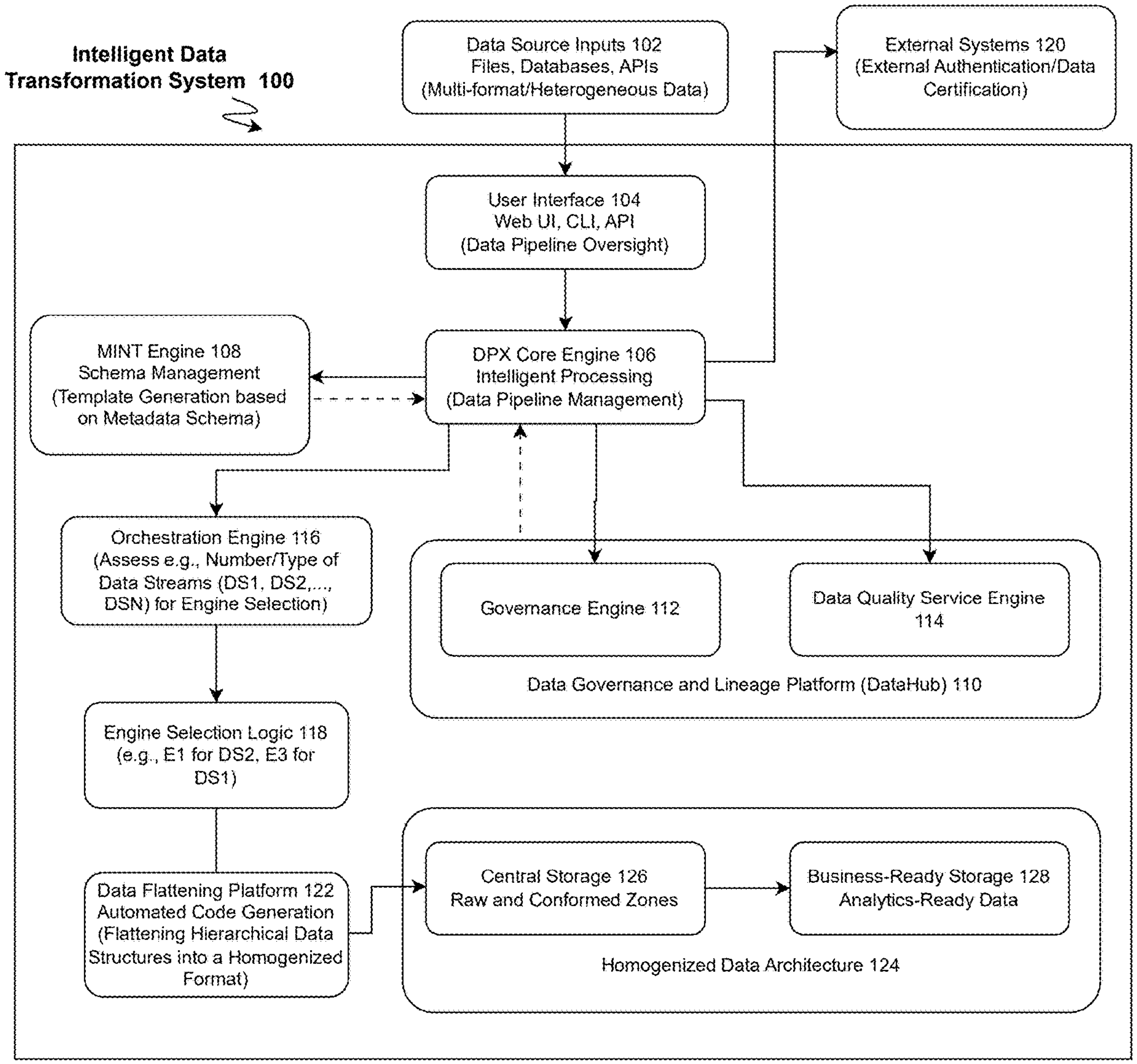
FIG. 1 illustrates an exemplary novel intelligent data transformation system for streamlined, enhanced intelligent transformation of data received from diverse computing platforms into a homogenized data architecture that can be accessed for enhanced enterprise efficiency.

FIG. 1 shows an intelligent data transformation system for intelligent transformation of data received from diverse computing platforms into a homogenized data architecture. The FIG. 1 system architecture includes an exemplary intelligent data transformation system 100, wherein any or all data paths illustrated as unidirectional can alternately be bi-directional for data exchange.

The exemplary FIG. 1 system includes a user interface 104 including one or more application programming interfaces (APIs), the user interface 104 configured to receive plural data source inputs 102 including one or more security credentials and one or more sample datasets, and manage movement of data from the plural data source inputs 102 within the intelligent data transformation system 100. As referenced herein, data includes any information from any source that can be digitized and processed with the system disclosed herein.

The data source 102 can include structured and semi-structured sources from any digital information source including but not limited to files, databases, and APIs. A data source 102 can include cloud object storage systems. Examples of cloud object storage include but are not limited to known storage such as Amazon Simple Storage Service (S3), Azure Blob Storage, and Google Cloud Storage, which can be used for storing files and objects. The data source 102 can include any known data source, such as Relational Database Management System (RDBMS) systems such as Structured Query Language (SQL) Server, Oracle, and PostgreSQL, which can provide structured data access. The data source 102 can include any database information including but not limited to NoSQL database systems such as MongoDB, Cosmos DB, DynamoDB, and Cassandra, which can provide semi-structured data storage. The data source 102 can include any event streaming platforms including those that provide real-time stream processing capabilities. The data source 102 can include external Application Programming Interfaces (APIs) for any third-party data sources such as SNAP, Workday, Pinterest, Meta, Amazon Ads, and MediaAlpha, which can enable integration with external systems 120.

Figure 2:
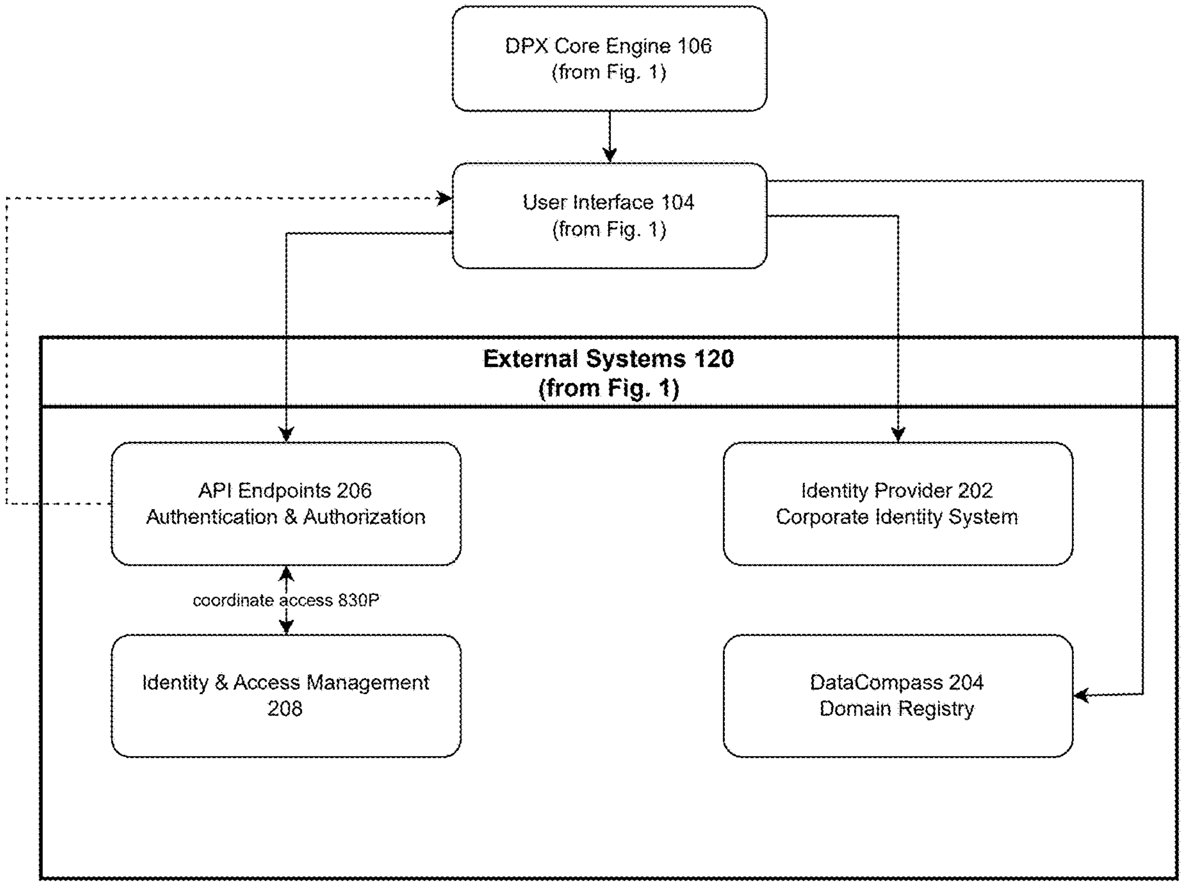
FIG. 2 illustrates an exemplary integration of external systems with added authentication capability for the intelligent data transformation system.

The external systems 120, illustrated in greater detail in FIG. 2, can include an identity provider 202 associated with an external corporate identify system which provides identification information, and with API endpoints 206 associated authentication and authorization, and an identify and access management service/platform 208. A data domain registry which provides domain registration and related services is provided and referred to as a data compass registry 204.

Referring back to FIG. 1, the user interface 104 includes a home dashboard providing an overview of a status of a configured data pipeline and enabling navigation to various data management dashboards across the platform as selected by the user. These can include an asset management dashboard for user oversight and/or control of operations such as creation, modification, and deletion of data assets; a pipeline management dashboard with version history to track pipeline evolution and changes; and a connection management dashboard for user oversight and/or control of source configuration and connection testing. The exemplary user interface 104 includes a data quality management dashboard, which supports user oversight and/or control of automated Data Quality (DQ) scans and Balance Control (BC) checks for ongoing quality monitoring (e.g., ensure data has not been modified using known data checks). An access management dashboard employing Role-Based Access Control (RBAC) is configured for user oversight and/or control of permission management of, for example, any desired user-configured permissions. A transformation management dashboard supports user overview and control of raw-to-conformed (R2C) transformation workflows and environment promotion workflows for cross-environment deployment.

The exemplary FIG. 1 system includes a DPX core system 106 with a DPX core engine 106 configured to perform intelligent data transformation, the DPX core engine including a pipeline orchestration engine configured to interface with the APIs to coordinate data movement workflow from the plural data source inputs along a data pipeline. The DPX core engine 106 manages pipeline orchestration coordinating data movement workflows across multiple processing engines. The DPX core engine 106 coordinates security operations including encryption, decryption, and masking compliance based on business attributes. To enhance usability, the DPX core engine 106 provides complexity abstraction (e.g., abstraction of information within diverse data flow) enabling automated engine selection while maintaining user simplicity.

The exemplary FIG. 1 system includes engine selection logic 118 configured to select a processing engine from a plurality of processing engines based on one or more characteristics of at least some data in the data pipeline characterizing a data source from which the at least some data was received, wherein selection of a processing engine is based at least in part on intelligent data analysis (e.g., analyzing and distinguishing bounded batch data from unbounded real-time streaming data based, for example, on a data source being batch versus streaming, or identifiable characteristics within the data such as batch data boundaries and/or volume). Each data stream in the data pipeline is routed to a selected processing engine suitable for processing that data stream. For example, the engine selection logic can identify a data stream originating from a real-time video data source as being most suitable for a stream processing engine. Alternatively, the engine selection logic can identify a data stream originating from a SQL database as being most suitable for a batch processing engine. By identifying the type of input data (e.g., batch data or streaming data) and automatically routing input data to selected processing engine specifically configured to handle said type, the intelligent data analysis performed by the engine selection logic mitigates and/or eliminates processing bottlenecks thereby improving the processing efficiency of the intelligent data transformation system. In using the disclosed intelligent data analysis to perform the engine selection automatically, the engine selection logic reduces the complexity of the intelligent data transformation system by removing the need for users or data engineers to understand engine-specific technical details. This automation can improve the usability of the intelligent data transformation system while reducing or eliminating configuration errors associated with manual engine selection.

The exemplary FIG. 1 system includes a metadata integration schema (MINT) engine 108, also referenced herein simply as the MINT 108, configured to selectively interact with the data pipeline to infer a schema of metadata when metadata is present in the data pipeline.

Figure 3:
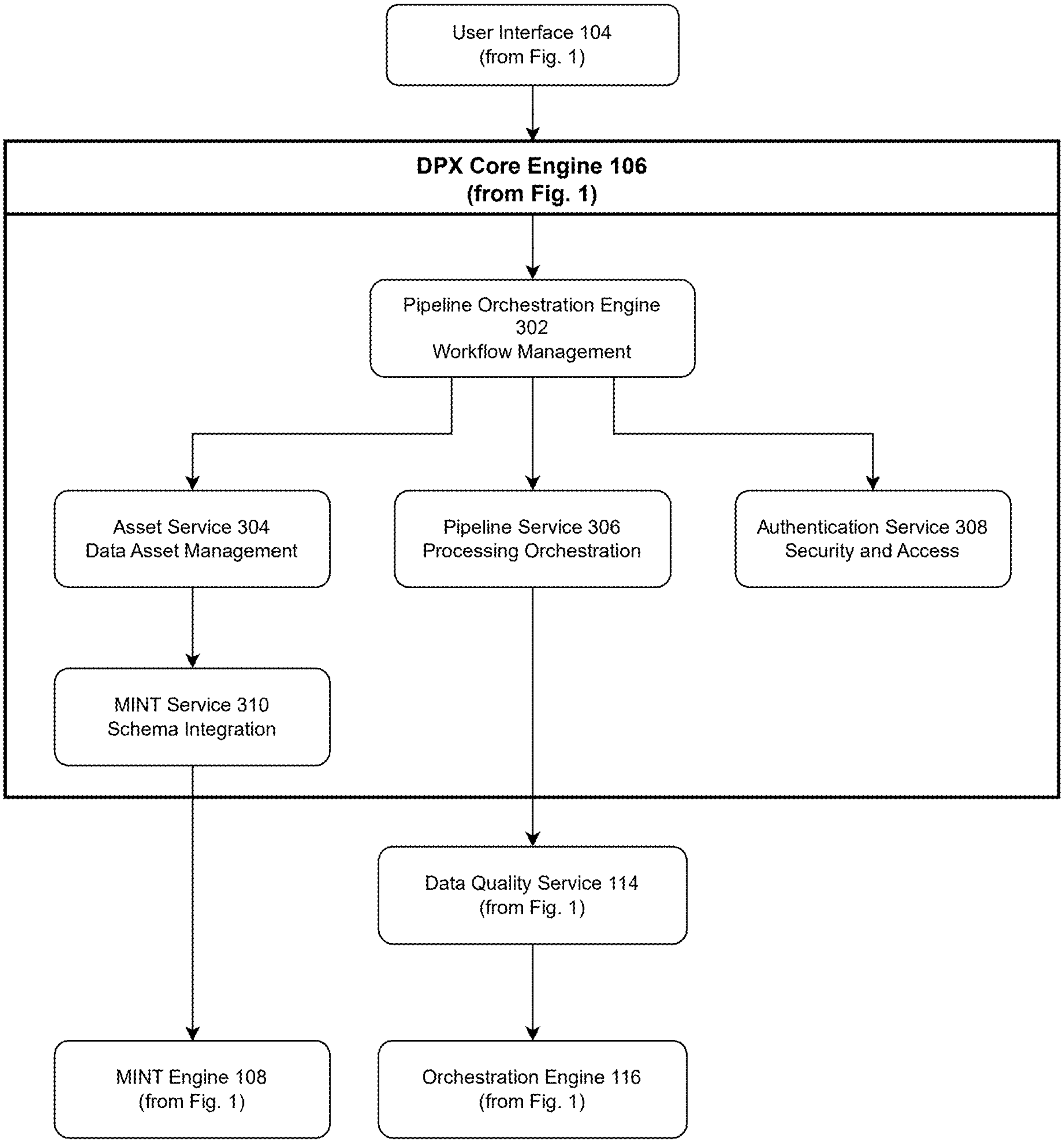
FIG. 3 illustrates an exemplary configuration of a novel DPX core engine which provides enhanced data flow from a user interface to various downstream components of the intelligent data transformation system.
Figure 4:
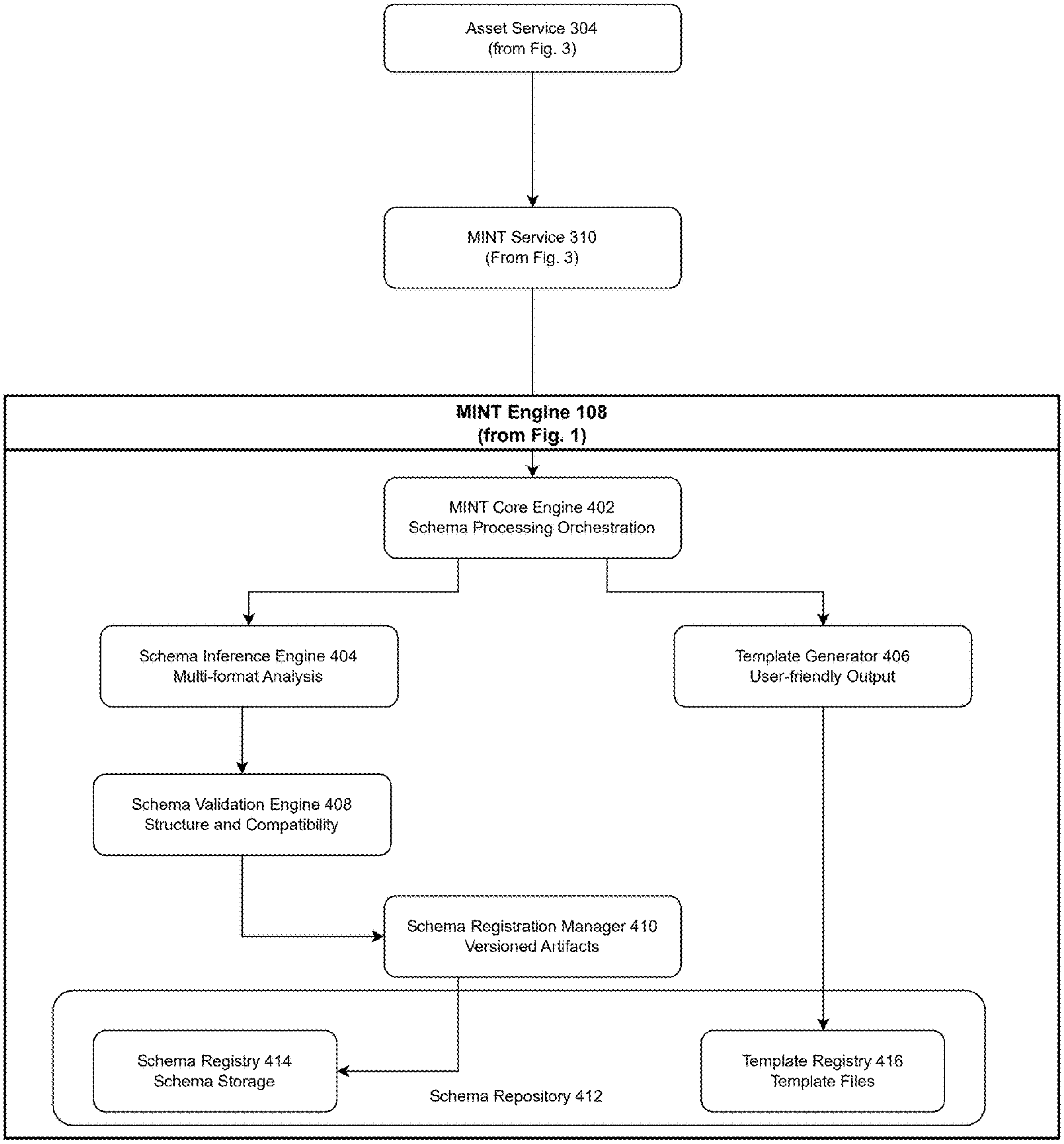
FIG. 4 illustrates an exemplary configuration of a novel metadata integration (MINT) schema engine which coordinates with components of the DPX core engine for automated and enhanced schema processing and inference.

As shown in FIGS. 3 and 4, which will be described in detail below, the MINT engine 108 receives data from a data pipeline from a MINT schema integration service 310, also referred to herein as MINT service 310.

Referring to FIG. 4, the MINT engine 108, using MINT core engine 402, applies one or more rules (e.g., predefined rules) to identify whether metadata in the data is suitable for a spreadsheet format. For example, the MINT core engine 402 identifies if the metadata is multi-format metadata, in which case it can be deemed not suitable for a spreadsheet format. If the metadata is not suitable for a spreadsheet format, the metadata is routed to a schema inference engine 404. The schema inference engine 404 uses one or more classification models and/or a set of predefined rules to infer a schema for each format of metadata in the metadata. Conversely, if the metadata is suitable for a spreadsheet format, the metadata is routed to a template generator 406, which generates a template for the metadata in a spreadsheet format. In exemplary embodiments, the classification models and/or predefined rules employed by the schema inference engine 404 identify formats within the multi-format metadata (e.g., JSON, XML, CSV) and detect column names and data types. By performing automatic schema inference, the schema inference engine 404 both reduces and/or eliminates the need for manual schema definition and reduces the errors caused by user-specified configurations. Additionally, by facilitating automatic processing of diverse metadata formats, the MINT engine 108 can perform multi-format schema inference without requiring format-specific manual configuration. The automation of schema inference for multi-format metadata using classification models (e.g., technical algorithms) and/or predefined rules improves the data processing accuracy of the intelligent data transformation system relative to prior art solutions by reducing schema definition errors associated with manual schema definition and format configuration.

Referring back to FIG. 1, the exemplary intelligent data transformation system 100 includes a data flattening platform 122 connected to the data pipeline and configured to receive and process data from a selected processing engine and from the MINT to generate computer code that when executed will produce flattened data, wherein the flattened data is based on at least one or more parent-child relationships of hierarchical data structures within the input data identified using intelligent data transformation, execute the computer code to produce the flattened data, and store the flattened data in a homogenized data architecture 124 accessible by the user interface 104. This intelligent data transformation can include identifying hierarchical and/or nested dependencies within data in the data pipeline. For example, the data flattening platform 122 can evaluate specified fields or characteristics of JSON/XML files to locate and/or identify exemplary data fields (e.g., Parent_ID and Child_ID) as having a hierarchical, parent-child dependency to generate computer code representing a recursive nested structure processing algorithm. The intelligent data transformation can include generating computer code that implements array and list processing algorithms that extract elements to table rows for parent tables and child tables. These tables constitute flattened data suitable for SQL database queries and storage in the homogenized data architecture 124. By automatically identifying hierarchical dependencies within data and generating code to resolve these dependencies into separate tables, the intelligent data transformation performed by the data flattening platform 122 reduces the errors associated with user review of large datasets. Not only do the specific technical algorithms implementing the intelligent data transformation improve how computers process hierarchical data, but the automatically generated computer code also reduces and/or eliminates the need for manual code writing altogether. Furthermore, in performing this flattening, the resultant data is suitable for storage in a homogenized data architecture with query functionality (e.g., via SQL queries) allowing authorized users and data producers to access said data in a uniform and structured manner.

Exemplary inputs and outputs of the data flattening engine are exhibited below:

```
BEFORE (Nested JSON):
```json
{
  "order_id": "ORD-001",
  "customer": "John",
  "items": [
    {"product": "Laptop", "quantity": 1, "price": 399.99},
    {"product": "Mouse", "quantity": 2, "price": 29.99}
  ]
}
```
AFTER (Flattened Tables):
orders table:
| order_id | customer | items_payload |
|----------|----------|-------|
ORD-001 | John | { "product": "Laptop", "quantity": 1, "price": 399.99},
                   {"product": "Mouse", "quantity": 2, "price": 29.99}
items table:
| order_id | product | quantity | price |
|----------|---------|----------|-------|
| ORD-001 | Laptop | 1 | 399.99
| ORD-001 | Mouse | 2 | 29.99
BEFORE (Nested XML)
```xml
<policy>
  <policy_number>POL-2025-5678</policy_number>
  <policyholder>Jane Doe</policyholder>
  <effective_date>2025-01-01</effective_date>
  <coverage>
    <type>Auto</type>
    <vehicles>
      <vehicle>
        <vin>1HGBH41JXMN109186</vin>
        <make>ManufacturerA</make>
        <model>ModelA</model>
        <year>2023</year>
        <coverage_limit>50000.00</coverage_limit>
      </vehicle>
      <vehicle>
        <vin>5YJSA1E26HF123456</vin>
        <make>ManufacturerB</make>
        <model>ModelB</model>
        <year>2024</year>
        <coverage_limit>100000.00</coverage_limit>
      </vehicle>
    </vehicles>
  </coverage>
</policy>
```
AFTER (Flattened Tables)
policy table:
| policy_number | policyholder | effective_date | coverage | vehicles_payload
|---------------|--------------|----------------|---------------|--------------|--------------|
| POL-2025-5678 | Jane Doe | 2025-01-01 | Auto | <xml array converted to json
payload>
vehicles table:
| policy_number | vin | make | model | year | coverage_limit
|---------------|-----|------|-------|------|----------------|--------------|--------------|
| POL-2025-5678 | 1HGBH41JXMN109186 | ManufacturerA | ModelA | 2023 |
50000.00
| POL-2025-5678 | 5YJSA1E26HF123456 | ManufacturerB | ModelB | 2024 |
100000.00
```

The exemplary user interface 104 of FIG. 1 can include a plurality of DPX interfaces including a Web User Interface (Web UI), a Command Line Interface (CLI) and one or more Application Programming Interfaces (APIs). The one or more APIs include at least one Representational State Transfer (REST) API. The DPX interfaces are used to implement the various data management dashboards.

The exemplary user interface 104 is configured to perform intelligent input analysis evaluating data source type (e.g., batch versus streaming), Service Level Agreement (SLA) requirements (e.g., associated with the data source), data boundaries and/or data volume and/or data estimates, security classification(s), and business attributes for automated processing decisions; register the plural data source inputs using information including connection details, security credentials, and sample datasets; verify an identity of a user using personally identifiable information (PII); receive the schema inferred by the MINT engine 108; and enrich the metadata within the received schema using for example any results of the analysis and/or offer desired enrichments.

The MINT engine 108 of FIG. 1 is configured to generate spreadsheet templates in spreadsheet format pre-populated with intelligent suggestions for table names, column names, and data types based on analyzed data structures, wherein the templates integrate business context from domain governance systems enabling business users to enrich metadata without technical complexity. For example, a template format can be established via the user interface for each data type, and/or via indications provided in metadata which signify appropriate suggestions for inclusion in the template.

The MINT engine 108 of FIG. 1 is thereby configured to populate the spreadsheet templates with SUGGESTED_TABLE_NAME recommendations for table organization; populate the spreadsheet templates with SUGGESTED_COLUMN_NAME and SUGGESTED_DATA_TYPE recommendations for field definitions; automatically configure extraction flags, validation settings, and Raw-to-Conformed (R2C) defaults for efficient processing; and incorporate business context from domain attributes and governance metadata enriching suggestions with organizational knowledge.

The MINT engine 108 of FIG. 1 is configured to generate intelligent suggestions for table names and column names derived from nested path analysis of hierarchical data structures, wherein the intelligent suggestions are based on actual data patterns identified through intelligent data analysis, and wherein the intelligent suggestions are business-friendly names suitable for non-technical users.

The exemplary MINT engine 108 of FIG. 1 can be configured to automatically enrich an inferred schema with business context from domain governance systems (such as from the governance engine 112), wherein the business context can, for example, include domain attributes, ownership information, and business glossary terminology, and wherein the enriched schema maintains both technical schema information and business metadata.

The exemplary MINT engine 108 of FIG. 1 also can be configured to integrate business context from a domain registry including business unit domain identifiers, designations identifying use of data in production or non-production environments, and access level permissions, and wherein the enriched schema includes complete business context from domain metadata.

The exemplary MINT engine 108 of FIG. 1 can be configured to perform multi-format analysis to infer the schema from metadata in formats including JavaScript Object Notation (JSON), Extensible Markup Language (XML), comma separated format (CSV), columnar storage format, JavaScript Object Notation Lines (JSONL), and spreadsheet formats. By enabling automatic schema inference across diverse metadata formats, the MINT engine 108 reduces and/or eliminates the need for format-specific manual configuration and reduces the errors associated with user intervention.

The exemplary FIG. 1 system includes an exemplary data governance and lineage platform 110, hereafter referred to as an exemplary DataHub 110, including a data quality service engine 114 configured to provide one or more quality metrics for the schema inferred by the MINT from input data received at the user interface. The DataHub 110 of FIG. 1 includes a domain registry 702 configured to store domain metadata extracted from the inferred schema, divide business domains included in the domain metadata into a hierarchy of subdomains organizing the input data by business units and functions, track ownership information identifying owners and/or custodians of the input data, and enforce governance policies requiring proper organization of the input data and domain-based routing of the input data through the data pipeline.

The DataHub 110 of the exemplary FIG. 1 system includes a business attributes manager 704 configured to identify and protect sensitive data in the input data and manage a glossary of standardized terminology to ensure the input data is consistently defined. For example, data identified as sensitive data (e.g., with a flag, or user input), such as proprietary information and/or personal identification information, and/or possessing characteristics flagged as sensitive via the user interface and/or in accordance with a rule or policy can thereby be managed to, for example, ensure that it is not abstracted in a way that deletes its ability to be flagged and processed as sensitive data, throughout the platform and when stored in the homogenized data architecture 124.

The DataHub 110 of the exemplary FIG. 1 system includes a lineage engine configured to track data lineage relationships capturing source-to-destination flows of the input data along the data pipeline. The DataHub 110 can automatically capture data lineage (e.g., data source, such as an IP address or other) from multiple processing engines including batch processing engines 708, stream processing engines 710, and transformation engines 712. The DataHub can be configured to integrate data quality results into lineage metadata. The DataHub can track data lineage relationships capturing source-to-destination flows (e.g., track original and/or intermediate source and destination IP addresses of data) along the data pipeline with automatic propagation of business attributes through a lineage graph. The DataHub can capture lineage from batch processing engines processing file-based and NoSQL database data, from stream processing engines processing real-time streaming and Change Data Capture (CDC) data, and/or from transformation engines executing generated transformation code.

The DataHub 110 of the exemplary FIG. 1 system can provide end-to-end lineage from source to consumption across all data zones including raw, conformed, and consumption layers, and any intermediate points.

The data quality service engine 114 is configured to perform automated balance control checks across multiple data zones including raw zones, conformed zones, and consumption zones. The data quality service engine 114 can, for example, validate record counts across zone boundaries during transformations. The data quality service engine 114 can also perform aggregate balance verification including sums and averages across zone boundaries. The exemplary data quality service engine 114 is configured to integrate balance control results with data lineage.

The exemplary FIG. 1 system includes an orchestration engine 116 configured to manage directed acyclic graph lineage for job scheduling dependencies along the data pipeline, and interface, via the one or more APIs, with one or more development platforms to facilitate deployment and integration of the data pipeline by coordinating automatic code generation, testing, and production workflows.

The engine selection logic 118 of the exemplary FIG. 1 system includes a complexity abstraction layer configured to hide technical details from users to provide a simplified interface for data movement operations. The complexity abstraction layer is configured to automatically manage any or all technical configurations without user intervention. The complexity abstraction layer is configured to coordinate security operations transparently handling encryption and masking automatically.

For example, complexity abstraction layer is configured to handle engine-specific parameters without user involvement ensuring appropriate processing configuration, wherein users interact through the user interface without specifying processing engines or technical configuration details. This abstraction reduces the complexity of the intelligent data transformation system by removing the need for users to understand engine-specific technical details. This improves the system's usability and reduces configuration errors associated with manual engine selection.

The engine selection logic 118 of the exemplary FIG. 1 system includes a decision engine configured to analyze information such as source type, Service Level Agreement (SLA) requirements, data volume estimates, processing frequency, security requirements, business attributes, and masking policies to automatically select the processing engine from the plurality of processing engines, and wherein the complexity abstraction layer automatically maps user input to engine-specific configurations. In performing the selection automatically, the engine selection logic 118 removes the need for users or data engineers to understand engine-specific technical details. This automation improves the usability of the intelligent data transformation system while reducing configuration errors associated with manual engine selection.

The data flattening platform 122 of the exemplary FIG. 1 system is configured to automatically generate a transformation repository including a transformation project configuration file with environment-specific settings, one or more data transformation models implementing flattening logic for hierarchical data structures, one or more source configuration files defining input data sources, one or more macro files containing reusable transformation functions for nested data processing, and one or more test files with data quality validation rules. By generating the code automatically, the data flattening platform 122 reduces and/or eliminates the need for manual code writing thereby reducing code generation errors associated with user-configured methods and improving the data processing efficiency of the intelligent data transformation system.

The data flattening platform 122 of the exemplary FIG. 1 system is configured to automatically integrate the transformation repository within a continuous integration and continuous deployment (CI/CD) pipeline including repository template cloning for establishing baseline transformation foundations, CI/CD pipeline generation creating deployment templates for automated deployment workflows, schedule configuration for automated job scheduling, and quality gate setup with automated testing workflows ensuring code quality before deployment.

The data flattening platform 122 of the exemplary FIG. 1 system is configured to automatically generate computer code (using, e.g., any available code generator) for creating the transformation repository using a data transformation tool configured for generating Structured Query Language (SQL)-based transformation models, wherein the complete transformation repository includes SQL code for flattening nested data structures into parent and child tables. The exemplary data flattening platform 122 of FIG. 1 is configured to implement recursive nested structure processing for deep hierarchies navigating complex nesting levels and implement array and list processing for element extraction converting arrays to table rows.

The data flattening platform 122 of the exemplary FIG. 1 system is configured to analyze hierarchical data structures within the input data to intelligently identify one or more parent-child relationships (e.g., based on recognized embedded information and/or identifiers) automatically generate parent tables containing root-level entities extracted from nested data with primary keys for unique identification, automatically generate child tables containing nested array elements extracted from complex structures with foreign key relationships to the parent tables maintaining referential integrity, and preserve business context from metadata in both the parent tables and child tables. By automatically identifying hierarchical dependencies within data and generating code to resolve parent-child relationships into separate tables, the intelligent data transformation performed by the data flattening platform 122 reduces the errors associated with user review of large datasets.

The data flattening platform 122 of the exemplary FIG. 1 system is configured to implement cross-format compatibility, for a variety of data formats including but not limited to JavaScript Object Notation (JSON) and Extensible Markup Language (XML), applying unified flattening approaches. The data flattening platform is configured to implement business context preservation while flattening technical structures maintaining semantic meaning.

The data flattening platform 122 of the exemplary FIG. 1 system is configured to analyze nested structures to recommend suitable table decomposition strategies. The data flattening engine is configured to suggest how to break complex structures into parent tables and child tables enabling normalized data access. This normalized data access provides authorized users and data producers to uniformly query (e.g., via SQL queries) the homogenized data architecture for enterprise data.

The homogenized data architecture 124 of the exemplary FIG. 1 system provides organized flattened data into a storage database with functional zones including, for example, a raw zone for storing the flattened data in its original format and providing proper data segregation by business domain, and a conformed zone maintaining a homogenized, domain-aligned data structure preserving business context of the flattened data transformed from the raw zone.

The homogenized data architecture 124 of the exemplary FIG. 1 system is configured to transform, using a database transformation engine, the flattened data stored in the raw zone to the conformed zone, ensuring that transformations of flattened data between the raw zone and the conformed zone comply with a number of parameters. First the transformations can either execute completely or, if met with an error, abort. Second, the transformations can maintain the integrity of the flattened data in accordance with governance policies. Third, the transformations can be isolated, preventing a first transformation from interfering with a second transformation resulting in data inconsistencies in the conformed zone. In exemplary embodiments, the transformations are permanent and robust to system outages and failures.

The homogenized data architecture 124 of the exemplary FIG. 1 system is configured to enforce security policies providing fine-grained access control, row level-security, and column-level masking.

FIG. 4 illustrates details of an exemplary configuration of a MINT engine 108 for the intelligent data transformation system 100 shown in FIG. 1. The MINT engine is configured to selectively interact with a data pipeline to infer a schema of metadata when metadata is present in the data pipeline.

The exemplary MINT engine 108 of FIG. 4 includes a MINT core engine 402 configured to selectively receive metadata describing input data provided by a user at the user interface 104, evaluate whether the metadata is suitable for a template in spreadsheet format, provide schema processing orchestration by routing metadata unsuitable for a template in spreadsheet format to a schema inference engine and routing metadata suitable for a template in spreadsheet format to a template generator, and manage inference workflows requesting schema detection from sample data from a data pipeline. The MINT core engine 402, applies one or more predefined rules to identify whether the metadata is suitable for a spreadsheet format. For example, the MINT core engine 402 can identify if the metadata is multi-format metadata, in which case it is not suitable for a spreadsheet format. If the metadata is not suitable for a spreadsheet format, the metadata is routed to a schema inference engine 404. The schema inference engine 404 uses one or more classification models and/or a set of predefined rules to infer a schema for each format of metadata in the metadata. Conversely, if the metadata is suitable for a spreadsheet format, the metadata is routed to a template generator 406, which generates a template for the metadata in a spreadsheet format.

The exemplary MINT engine 108 of FIG. 4 includes a schema inference engine 404 configured to perform multi-format analysis to infer a schema of the metadata. For example, the schema inference engine 404 uses one or more classification models and/or a set of predefined rules to infer a schema for each format of metadata in the metadata.

The exemplary MINT engine 108 of FIG. 4 includes a template generator 406 configured to generate templates in spreadsheet format including suggestions for table names, column names, and data types based on analyzed data structures. For example, the template generator 406 cross-references the received metadata with a repository of business-approved table names, column names, and data types to identify a common synonym, attribute, or meaning. For example, metadata might include a title for a database such as "Accident Report History." The template generator 406 identifies the word "history" as a temporal term and identifies the column name "date" as a temporal term in the repository.

The exemplary MINT engine 108 of FIG. 4 includes a schema validation engine 408 configured to perform structure and compatibility checks on all schema submissions received from the schema inference engine 404 to ensure data integrity.

The exemplary MINT engine 108 of FIG. 4 includes a schema registration manager 410 configured to track version history recording changes made to the schema, generate and maintain a unique identifier for the schema, and store the schema in a schema repository including one or more schema registries.

The exemplary MINT core engine 402 is configured to manage inference workflows requesting schema detection from sample data from the data pipeline by coordinating with the schema inference engine to analyze uploaded data files, coordinating validation workflows with the schema validation engine to ensure schema integrity and compatibility after schema inference, and orchestrating registration workflows with the schema registration manager to store versioned schema artifacts in the schema repository The exemplary schema inference engine 404 of FIG. 4 is configured to perform multi-format analysis to infer the schema from metadata in formats including JavaScript Object Notation (JSON), Extensible Markup Language (XML), comma separated format (CSV), columnar storage format, JavaScript Object Notation Lines (JSONL), and spreadsheet formats.

The exemplary schema inference engine 404 of FIG. 4 is configured to implement a JavaScript Object Notation (JSON) service for JSON inference with nested structure analysis identifying hierarchical data patterns, an Extensible Markup Language (XML) service for XML inference with hierarchical processing analyzing XML element structures, a delimited service for comma separated format (CSV) inference with delimiter detection identifying column structures and data types, a columnar storage service for columnar storage format inference with columnar analysis extracting schema from binary formats, and a JavaScript Object Notation Lines (JSONL) service for JSONL inference with line-delimited JSON handling processing newline-separated JSON records.

The exemplary schema inference engine 404 of FIG. 4 is configured to perform deep analysis of nested objects, arrays, and tabular structures understanding complex data patterns.

The exemplary template generator 406 of FIG. 4 is configured to create files in spreadsheet format with suggested table name recommendations for table organization, populate suggested column name and suggested data type recommendations for field definitions, and incorporate business context from domain attributes and governance metadata enriching suggestions with organizational knowledge.

The exemplary template generator 406 of FIG. 4 is configured to implement audit column injection automatically adding an ingestion identifier, ingestion timestamp, and fine name columns for data lineage tracking.

The exemplary schema validation engine 408 of FIG. 4 manager is configured to maintain artifact metadata including group identifiers and artifact identifiers for unique identification, track version history recording schema changes and evolution over time and ensure proper schema evolution through the registration lifecycle managing compatibility and versioning rules.

Figure 6:
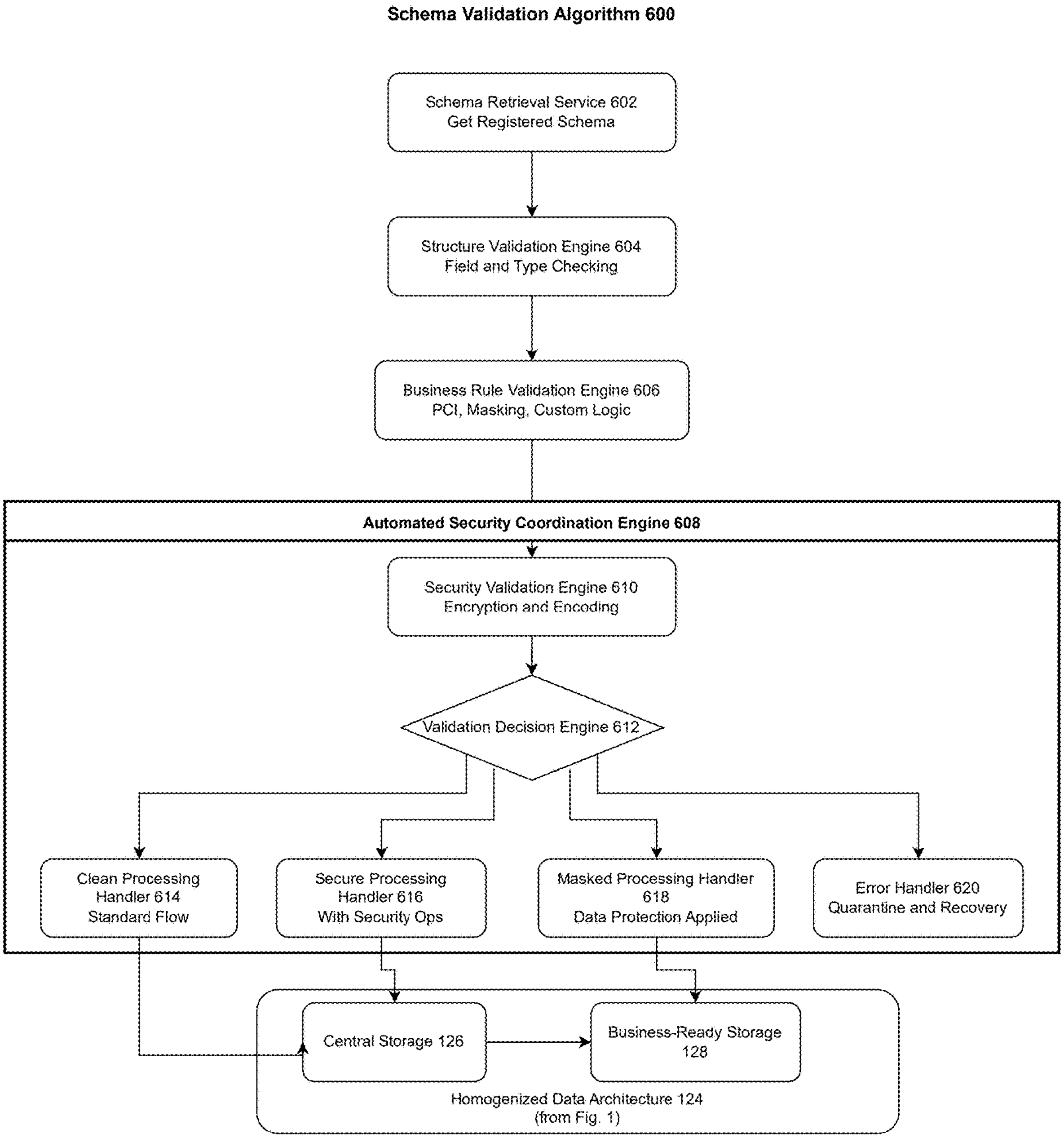
FIG. 6 illustrates an exemplary algorithm for schema validation, with a comprehensive real-time validation process and with advanced security operations executed by an exemplary automated security coordination engine.

In an exemplary embodiment, the intelligent data transformation system 100 of FIG. 1 can include an automated security coordination engine 608 as shown in FIG. 6. The automated security coordination engine 608 includes a security validation engine configured to determine protection levels and associated encryption requirements for the schema inferred by the MINT engine from the input data and/or using set rules and/or policies. The exemplary security validation decision engine is configured to generate a structure decision for structural integrity of the schema, a compatibility decision for schema evolution assignment, and a data quality decision to ensure quality of data within the schema complies with a given threshold quality metric, and route the schema to a selected security engine of a plurality of security engines on a data pipeline performing a specific security function, the selected security engine selected based at least in part on the protection levels and associated encryption requirements determined by the security validation engine.

Each security engine can include at least one processing handler configured to handle input data that passes validation checks and store input data that passes the validation checks in the homogenized data architecture, handle encryption functions in accordance with the protection levels and associated encryption requirements determined by the security validation engine, mask sensitive information within the input data in accordance with the protection levels determined by the security validation engine, and quarantine compromised data within the input data from uncompromised data within the input data and recover original data from the compromised data.

The exemplary automated security coordination engine 608 of FIG. 6 is configured to automatically determine security requirements from business attributes received from the DataHub, wherein the business attributes include data classification information from a business glossary, and perform dynamic masking based on business context received from the DataHub without manual security configuration.

Figure 8:
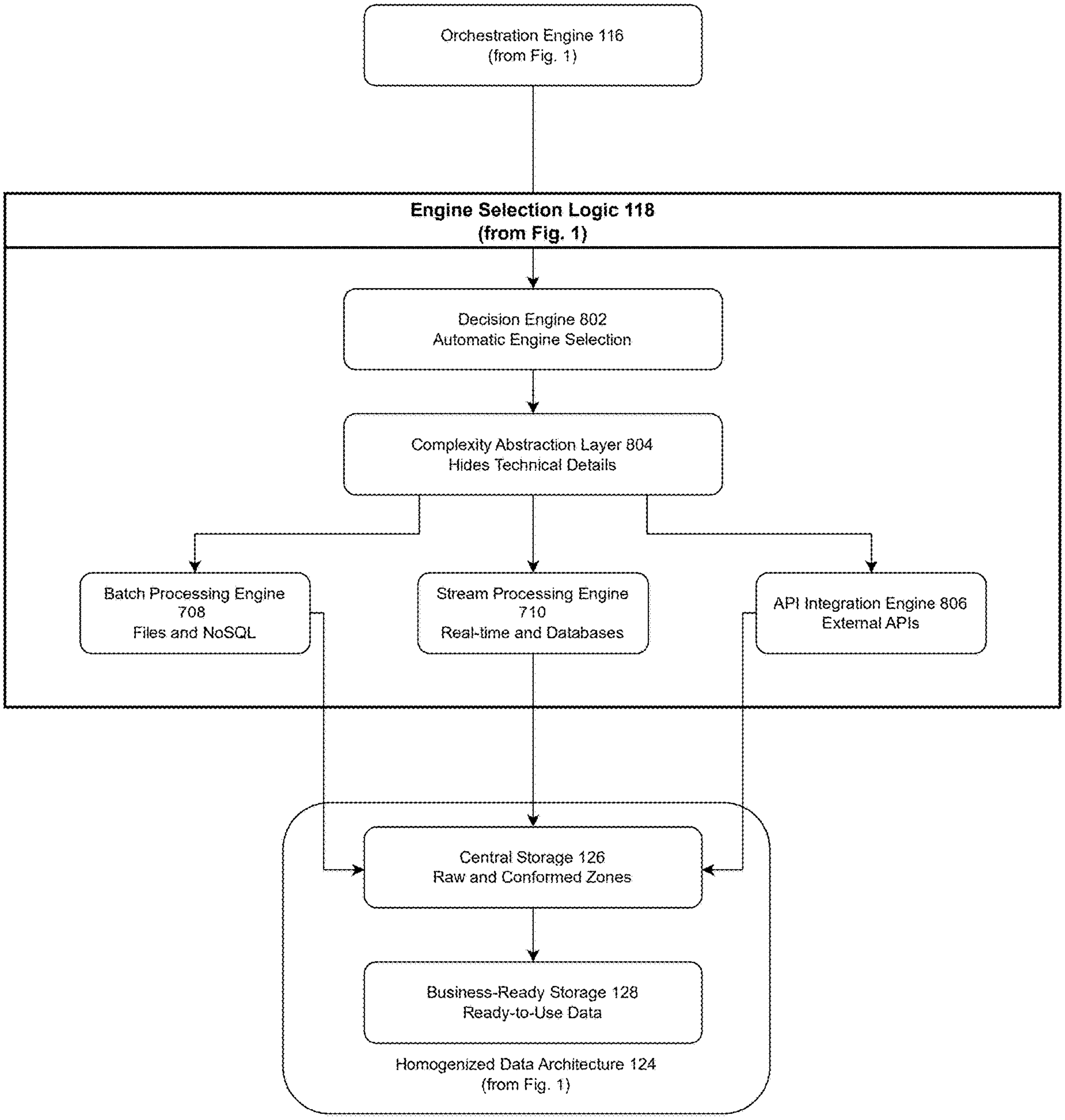
FIG. 8 illustrates an exemplary configuration of novel engine selection logic for executing enhanced, automated data flow from a data producer through an intelligently selected data processing engine to the homogenized data architecture while abstracting technical complexity.

FIG. 8 illustrates details of an exemplary configuration of engine selection logic 118 for the intelligent data transformation system 100 shown in FIG. 1. The engine selection logic 118 includes a decision engine 802 configured to receive input data provided to a data pipeline by a user at a user interface, and select a processing engine from a plurality of processing engines based on one or more characteristics of at least some of the input data characterizing a data source from which the at least some data was received, wherein selection of a processing engine is based at least in part on intelligent data analysis.

The exemplary engine selection logic 118 includes a complexity abstraction layer 804 configured to hide technical details from a user to provide a simplified interface for data movement operations, and coordinate security operations by selectively encrypting or masking vulnerable data included in the at least some data.

The exemplary engine selection logic 118 includes the plurality of processing engines, the plurality of processing engines configured to process the at least some data such that the at least some data is suitable for storage in a homogenized data architecture 124 for access by the user an/or selected enterprise functions/operations.

The exemplary decision engine is configured to analyze source type to determine appropriate processing approach. The decision engine is configured to analyze Service Level Agreement (SLA) requirements, data volume estimates, and processing frequency for performance optimization. The decision engine is configured to analyze security requirements and business attributes for data classification to determine the suitable processing approach. The decision engine includes a source type detector for analyzing user input identifying data source characteristics, an SLA analyzer for evaluating real-time vs batch requirements determining latency constraints, a security analyzer for interpreting business attributes and security policies; and an engine selector configured to automatically choose between a batch processing engine 708, a stream processing engine 710, and an API integration engine 806 based on analysis of source type, Service Level Agreement (SLA) requirements, data volume estimates, processing frequency, and security requirements. By identifying the source type of input data (e.g., batch data or streaming data) and automatically routing input data to selected processing engine specifically configured to handle said type, the intelligent data analysis performed by the engine selection logic mitigates and/or eliminates processing bottlenecks thereby improving the performance of the system.

The exemplary complexity abstraction layer is configured to completely abstract backend implementation details preventing users from needing infrastructure knowledge. The complexity abstraction layer is configured to manage all technical configurations automatically without user intervention. The complexity abstraction layer is configured to coordinate security operations transparently handling encryption and masking automatically. By performing this abstraction, the engine selection logic reduces and/or eliminates the need for users and data engineers to understand engine-specific technical details thereby improving the usability of the intelligent data transformation system and reducing configuration errors associated with manual engine selection.

The plurality of processing engines includes exemplary processing engines 808 (e.g., Spark), 810 (e.g., Flink), and an API integration engine 812. The processing engines can thus include a batch processing engine 708 configured for file-based and NoSQL database processing from cloud object storage systems, a stream processing engine 710 configured for real-time streaming and Change Data Capture (CDC) processing from event streaming platforms, and an API integration engine configured for external Application Programming Interface (API) integration with third-party data sources.

The exemplary complexity abstraction layer is configured to implement a security orchestrator for coordinating security operations across processing engines, an encryption/encoding detector for analyzing source data format determining required transformations, a masking policy engine for applying business attribute-driven protection automatically, and a security decision matrix for routing security operations automatically based on data classification. By overseeing these security operations automatically, the complexity abstraction layer reduces the vulnerabilities of the intelligent data transformation system by removing the need for users to manually configure and execute necessary encryption and masking policies.

Figure 9:
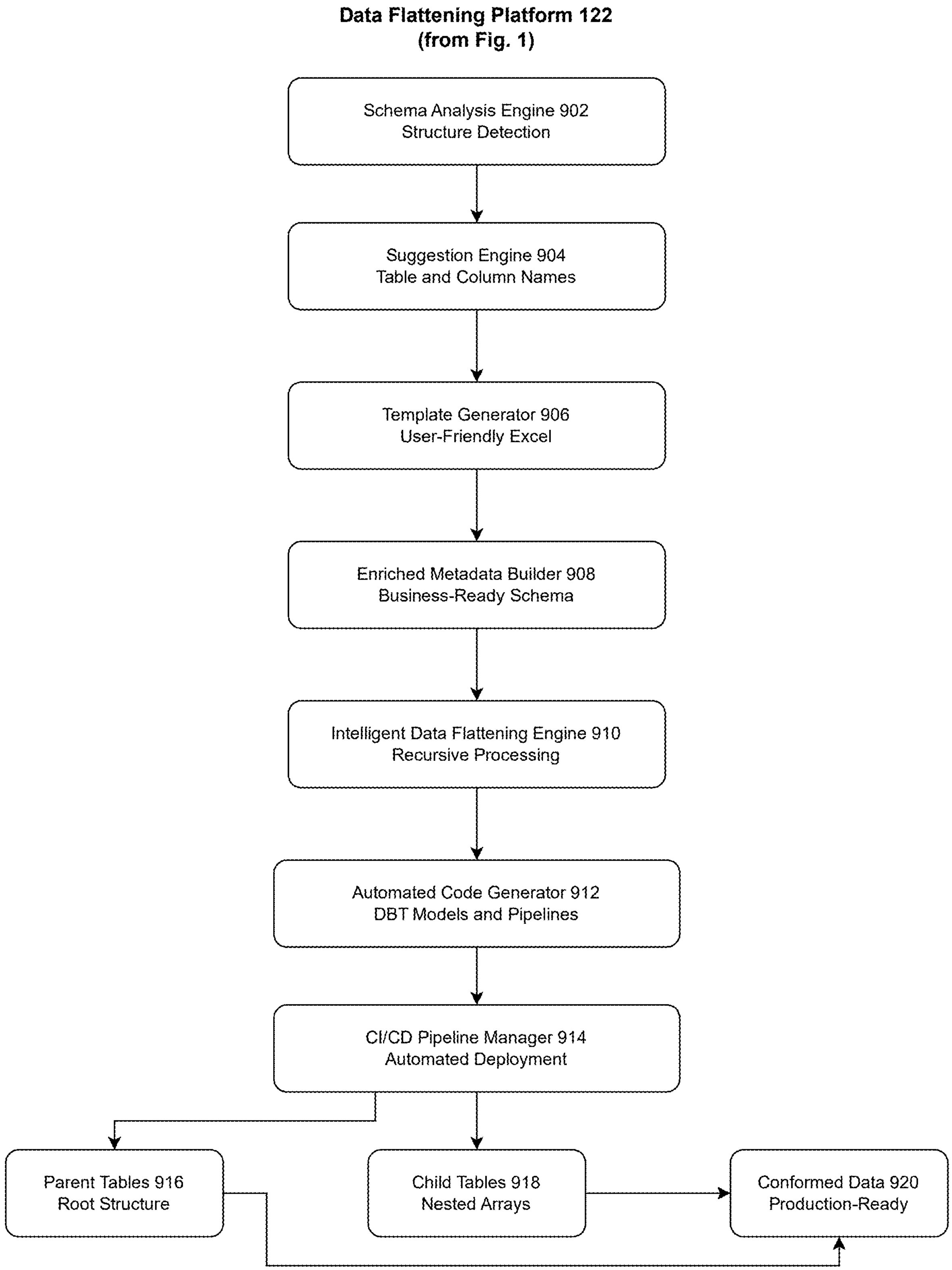
FIG. 9 illustrates an exemplary configuration of the data flattening platform, illustrating end-to-end automation from raw nested data to production-ready conformed tables suitable for storage in the homogenized data architecture.

FIG. 9 illustrates details of an exemplary configuration of a data flattening platform 122 for the intelligent data transformation system 100 shown in FIG. 1. The data flattening platform 122 includes a schema analysis engine 902 for data structure detection, a suggestion engine 904 (e.g., for suggestion table and column names), a template generator 906 (e.g., user-friendly Excel), and enriched metadata builder 908 (e.g., for business-friendly schema), and an intelligent data flattening engine 910. The intelligent data flattening engine 910 is configured to receive input data from a user interface via a selected processing engine, analyze metadata received from the MINT to determine possible flattening configurations, and execute computer code generated by an automated code generator 912 to produce flattened data, wherein the flattened data is based on at least one or more parent-child relationships of hierarchical data structures within the input data identified using intelligent data transformation. An output of the intelligent flattening engine 910 is provided to an automated code generator 912 (e.g., DBT models and pipelines). A CI/CD pipeline manager 914 provides automated deployment of the data to parent tables 916 and child tables 918 for transformation into conformed data 920 (production-ready).

The exemplary data flattening platform 122 includes the automated code generator 912, the automated code generator 912 configured to generate a transformation repository with configuration files including computer code that when executed by the intelligent data flattening engine 910 will produce flattened data. The exemplary data flattening platform 122 is configured to produce the flattened data using recursive array processing algorithms. The exemplary intelligent data flattening platform 122 is configured to implement recursive nested structure processing for deep hierarchies navigating complex nesting levels. The exemplary intelligent data flattening platform 122 is configured to implement array and list processing for element extraction converting arrays to table rows. By automatically implementing algorithms for recursive nested structure processing as well as array and list processing, the intelligent data transformation performed by the data flattening platform 122 reduces and/or eliminates the need for manual code writing. The exemplary intelligent data flattening platform 122 is configured to implement cross-format compatibility for JavaScript Object Notation (JSON) and Extensible Markup Language (XML) applying unified flattening approaches. The exemplary intelligent data flattening platform 122 is configured to implement business context preservation while flattening technical structures maintaining semantic meaning.

The exemplary automated code generator 912 is configured to generate a complete transformation repository with configuration files for environment-specific settings, implement model generation with data processing models implementing flattening logic, create sources generation for data source configuration defining input tables, implement macro generation with Extensible Markup Language (XML)/JavaScript Object Notation (JSON) flattening macros and reusable functions for code modularity; and create tests generation with comprehensive data quality validation ensuring data integrity. The automated code generator 912 is configured to generate complete transformation code automatically from enriched metadata using a data transformation tool configured for generating Structured Query Language (SQL) based transformation models. The exemplary intelligent data flattening platform 122 is configured to analyze enriched metadata to determine flattening configurations including parent-child table relationships with automatic join key propagation. The automated code generator 912 is configured to implement a Structured Query Language (SQL) generation engine delivering root and standard SQL generation based on enriched metadata and flattening configurations. Referring back to FIG. 1, the homogenized data architecture 124 of FIG. 1 is configured to organize the flattened data produced by the data flattening platform 122 into a storage database with functional zones including a raw zone for storing the flattened data in its original format and providing proper data segregation by business domain, and a conformed zone maintaining a homogenized, domain-aligned data structure preserving business context of the flattened data transformed from the raw zone.

The exemplary homogenized data architecture 124 is configured to transform, using a database transformation engine, the flattened data stored in the raw zone to the conformed zone, ensuring that transformations of flattened data between the raw zone and the conformed zone: either execute completely or, if met with an error, abort; maintain the integrity of the flattened data in accordance with governance policies; are isolated, preventing a first transformation from interfering with a second transformation resulting in data inconsistencies in the conformed zone; and are permanent and robust to system outages and failures. The homogenized data architecture 124 of FIG. 1 is configured to enforce security policies providing fine-grained access control, row level-security, and column-level masking.

With reference again to FIG. 1, the user interface 104 is configured to allow a user to submit requests for data movement from data sources 102 through a DPX core engine 106, which coordinates with a metadata integration schema (MINT) engine 108, a data governance and lineage platform 110 including an individual governance engine 112 and data quality service engine 114, and an orchestration engine 116 to automatically process data through processing engines selected by engine selection logic 118 to a homogenized data architecture 124 including a central storage 126 and a business-ready storage 128 without requiring manual programming or integration work.

The exemplary user interface 104 includes the home dashboard providing an overview of system status and enabling navigation to various data management dashboards for each component of FIG. 1. These can include an asset management dashboard for operations such as creation, modification, and deletion of data assets; a pipeline management dashboard with version history to track pipeline evolution and changes; and a connection management dashboard for source configuration and connection testing. Additionally, the interface can include a data quality management dashboard, which supports automated Data Quality (DQ) scans and Balance Control (BC) checks for ongoing quality monitoring (e.g., any available data checks can be invoked, such as checks to ensure data stored in different locations when transitioning between FIG. 1 components remains matched, and/or total sums (e.g., checksums) remain matched, and so forth). An access management dashboard employing Role-Based Access Control (RBAC) can be included to facilitate permission management. A transformation management dashboard can be provided to support raw-to-conformed (R2C) transformation workflows and environment promotion workflows for cross-environment deployment. The user interface 104 can support one or multiple access methods via the plurality of DPX interfaces, including Web UI (e.g., React-based), CLI, and REST API, to accommodate various user preferences and automation needs.

The user interface 104 can enable automation through command-line operations supporting various workflow categories. For example, the User Interface, at the access management dashboard, can be configured to verify an identity of a user using personally identifiable information (PII) to ensure secure system access. Alternatively, or in addition, these operations can include commands for password-based authentication, such as login and gsp-login. The user interface 104 can be configured to register the plural data source inputs using information about the at least one cloud object storage system including connection details, security credentials, and sample datasets. To facilitate the registration, the user interface 104 can provide pipeline commands including create-and-configure, deploy, and submit for pipeline lifecycle management. Connection management and configuration can be handled via dedicated connector commands. Data quality commands, such as data quality scans, can automate DQ and BC validation procedures. Secrets management can be supported through commands like write-secrets for credential handling and template commands for managing templates.

The user interface 104 can provide domain-aware interaction enabling users to select business domains for data organization. The user interface 104 can be configured to integrate with security systems for authentication and authorization workflows. The user interface 104 can be configured to perform intelligent input analysis evaluating source type, Service Level Agreement (SLA) requirements, data volume estimates, security classification, and business attributes for automated processing decisions.

The user interface 104 can receive the schema inferred by the MINT engine 108. The user interface 104 can be configured to enrich the metadata within the received schema. This ensures that the schema and associated metadata are complete, accurate, and aligned with organizational standards and requirements.

The MINT engine 108 can selectively interact with the data pipeline to infer a schema of metadata when metadata is present in the data pipeline. The MINT engine 108 includes a MINT schema registry for centralized schema management and version control. The MINT engine 108 can provide intelligent schema processing including automatic inference from diverse data formats. Additionally, the MINT engine 108 can provide schema intelligence including auto-suggestion for table and column names, schema enhancement with business context, and business context integration from domain governance systems.

Figure 7:
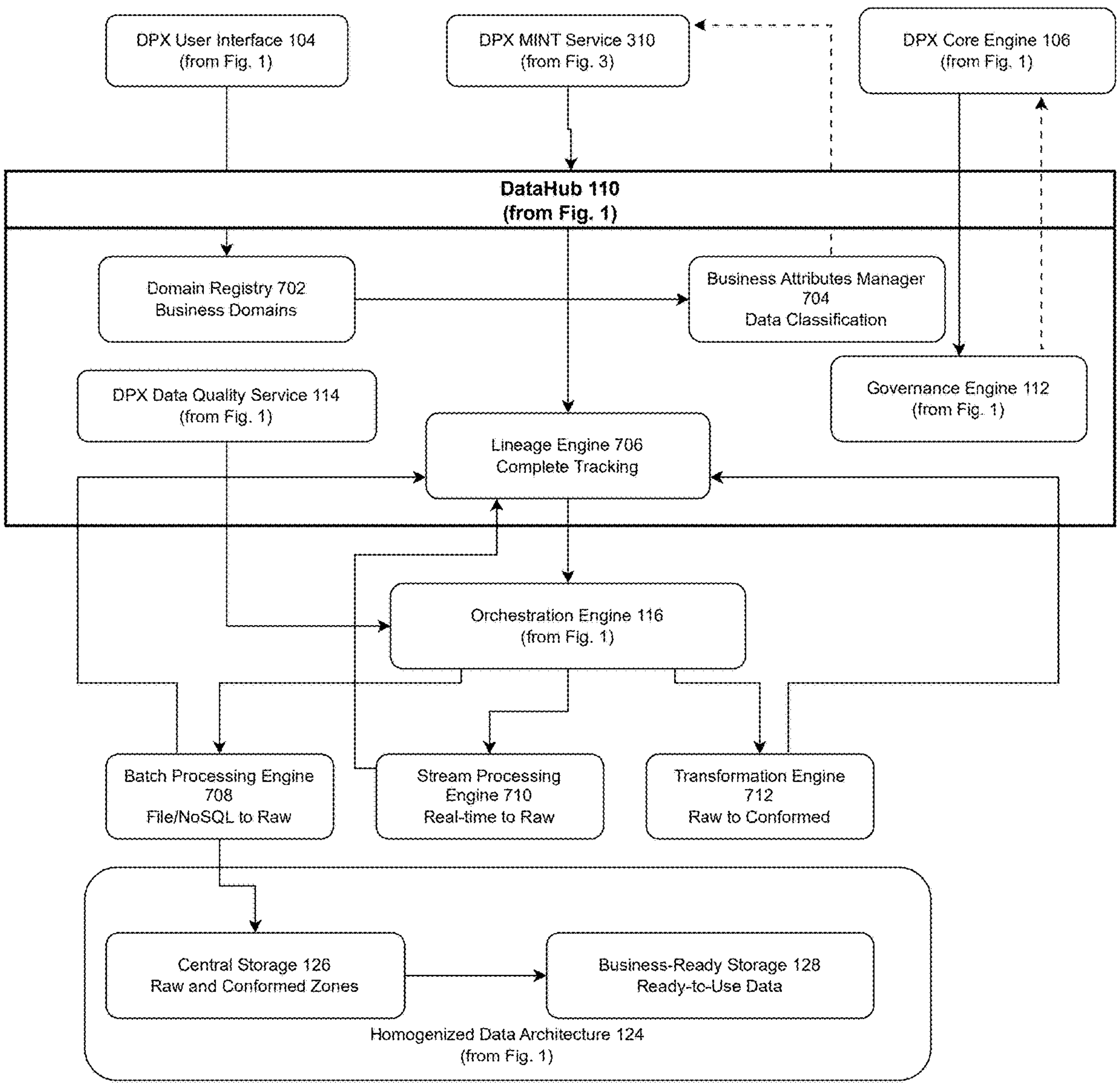
FIG. 7 illustrates an exemplary configuration of a data governance and linage platform, which is integrated across the data flow of the DPX to coordinate with the various elements of the intelligent data transformation system to provide comprehensive data governance and lineage tracking.

The exemplary DataHub 110 of system 100 provides lineage tracking capturing complete data movement provenance from source to consumption. Details of the DataHub 110 and its functional interface within the elements of the FIG. 1 system are shown in FIG. 7. In FIG. 7, the DataHub 110 includes a domain registry 702 regarding business domains, for supply to a business attributes manager 704 providing data classification. A lineage engine 706 provides complete data tracking (data lineage) using, for example, initial, intermediate, and final and final/floor destination and timestamps).

The DataHub 110 is configured to enable data discovery and cataloging, making all data assets discoverable across the enterprise. The DataHub 110 can be configured to manage domain governance ensuring proper data organization and access control based on business domains. The DataHub 110 can include comprehensive data quality management featuring data quality platform integration with third-party systems including but not limited to Soda, Great Expectations, and Deequ. The DataHub 110 can provide automated validation with policy enforcement and balance control verification across all data zones including raw, conformed, and consumption layers.

The exemplary orchestration engine 116 includes workflow orchestration and continuous deployment systems. The orchestration engine 116 can include any known workflow architecture, such as those readily available for workflow orchestration managing cross-platform Directed Acyclic Graph (DAG) scheduling and automated job execution. The orchestration engine 116 receives user inputs via the user interface 104 to schedule jobs in accordance with dependencies identified in the cross-platform DAGs. The orchestration engine 116 can include any known platforms for Continuous Integration/Continuous Deployment automation. The orchestration Engine 116 can thereby automate pipeline deployment coordinating code generation, testing, and production deployment workflows.

The engine selection logic 118 of system 100 selects a processing engine from a plurality of processing engines based on one or more characteristics of at least some data in the data pipeline characterizing a data source from which the at least some data was received, wherein selection of a processing engine is based at least in part on intelligent data analysis.

The data flattening platform 122 is connected to the data pipeline. The data flattening platform 122 can receive and process data from a selected processing engine and from the MINT engine 108 to generate computer code that when executed will produce flattened data, wherein the flattened data is based on at least one or more parent-child relationships of hierarchical data structures within the input data identified using intelligent data transformation as already described. In an exemplary embodiment, the data flattening platform 122 executes the computer code to produce the flattened data and stores the flattened data in the homogenized data architecture 124 which is accessible by the user interface 104.

The exemplary homogenized data architecture 124 of system 100 includes a central storage 126 organized into functional zones. The central storage can include a raw zone for storing ingested data in its original format with complete audit trails, at a user direction provided via the user interface. The central storage 126 can include a conformed zone for storing transformed and business-ready data with applied quality rules designated by the user. An exemplary central storage 126 can implement any available open table formats, including those from third-parties included but not limited to Apache Iceberg and Delta Lake. The central storage 126 can be configured to enforce security policies through any available third-party enforcement tools, including but not limited to Apache Ranger or other, and thereby provides fine-grained access control, row-level security, and column-level masking.

The homogenized data architecture 124 can include a business-ready storage 128 with multiple data layers. The business-ready storage 128 can include and support any available third-party cloud data warehouse platforms, including but not limited to Snowflake, Amazon Redshift, Google BigQuery, and Azure Synapse. The business-ready storage 128 can include a raw layer storing ingested data with minimal transformation. The business-ready storage 128 can include a conformed layer storing validated and business-ready data. The business-ready storage 128 can include a smart layer storing aggregated and optimized data for consumption. The exemplary business-ready storage 128 applies transformation-driven masking protecting sensitive data based on business attributes and security policies.

Referring to FIG. 3, details of an exemplary configuration of the DPX core engine 106 are provided. The DPX core engine 106 provides orchestration of backend data flow throughout various elements of the intelligent data transformation system 100 of FIG. 1. In exemplary embodiments, the DPX core engine 106 (as with the other elements of FIG. 1) coordinates with the user interface 104 enabling users to configure data processing workflows through the multiple DPX interfaces and data management dashboards, facilitating intuitive and flexible management of data operations.

The DPX core engine 106 analyzes user input including source type, data volume, and processing requirements. The DPX core engine 106 determines appropriate processing approaches selecting suitable engines and workflows enabling automated decision-making that optimizes data processing efficiency and effectiveness across the intelligent data processing system 100.

The pipeline orchestration engine 302 of the DPX core engine is used to interface with the APIs to coordinate data movement workflow from the plural data source inputs along a data pipeline. The pipeline orchestration engine 302 manages and synchronizes operations across several key services. These can include an asset service 304 responsible for data asset management including creation and lifecycle operations, a pipeline service 306 for overseeing processing orchestration and workflow orchestration, and an authentication service 308 for security and access control ensuring proper authentication and authorization.

In an exemplary embodiment, the pipeline orchestration engine 302 is configured to manage directed acyclic graph lineage for job scheduling dependencies along the data pipeline. As noted, the pipeline orchestration engine is configured to interface, via the one or more APIs, with one or more development platforms to facilitate deployment and integration of the data pipeline by coordinating automatic code generation, testing, and production workflows.

The exemplary asset service 304 handles data asset management and lifecycle operations for the intelligent data transformation system. It can manage asset creation, modification, and deletion workflows to maintain asset metadata including ownership, domain, and processing configuration. In exemplary embodiments, the asset service 304 is configured to coordinate with the MINT service 310 for schema integration enabling automated schema processing.

The exemplary pipeline service 306 can be configured to also be responsible for managing the orchestration of data movement workflows across the intelligent data transformation system 100. It can achieve this by coordinating the execution of pipelines across multiple processing engines, ensuring seamless data flow and transformation. The pipeline service 306 interfaces with the data quality service engine 114 of the DataHub 110 to perform quality validation, maintaining data integrity. It monitors pipeline states, handles errors, and implements retry logic to ensure robust and reliable data processing.

The exemplary authentication service 308 provides security and access control for the intelligent data transformation system. It manages user authentication by validating user identity and credentials and to enforce authorization policies that determine user permissions and access rights.

The exemplary MINT service 310 facilitates schema integration by coordinating interactions between the asset service 304 of the DPX core engine 106 and the MINT engine 108. The MINT service 310 submits schemas to MINT engine 108 for registration and version management, retrieves schemas for validation and processing, and manages schema lifecycle operations including creation, modification, and evolution tracking.

The exemplary DPX core engine 106 integrates with multiple external systems for comprehensive data platform capabilities. It interfaces with the MINT engine 108 for centralized schema registry management and with data quality services for automated data validation and quality checks. Additionally, it integrates with any available orchestration tools, such as Airflow and Azure DevOps for workflow automation, CI/CD pipelines, and deployment management.

In an exemplary embodiment, the DPX core engine 106 automatically determines security requirements from business attributes received from a data catalog platform, wherein the business attributes include data classification information from a business glossary, and wherein the DPX core engine applies masking dynamically based on business context from governance systems without manual security configuration.

The exemplary DPX core engine 106 connects with any available security policy enforcement systems and any available processing engines for batch or stream processing. For external API connectivity, it can use any platform, such as Airbyte, and for third-party transformation code generation, it can use any available transformation code generation tools, such as dbt. Metadata and lineage tracking are supported through integrations with available third-party data catalog platforms, including but not limited to DataHub, Collibra, and Alation. Credential security can be maintained third-party via secrets management systems, such as Azure Key Vault, AWS Secrets Manager, and HashiCorp Vault. For scalable storage and analytical processing, the engine can connect to cloud data lake storage systems (e.g., ADLS, S3, Google Cloud Storage) and data warehouses (e.g., Snowflake, Redshift, BigQuery). Monitoring and metrics collection can be enabled through integrations with Prometheus and other observability tools, ensuring comprehensive oversight of data operations.

The exemplary asset service 304 handles asset and schema management coordinating with MINT engine 108. The asset service 304 manages data asset lifecycle including creation, modification, and deletion operations. The asset service 304 coordinates schema submission workflows transmitting schemas to MINT engine 108 for registration. The asset service 304 maintains asset metadata including domain, ownership, and processing configuration.

The exemplary MINT service 310 serves as the integration client coordinating interactions between the DPX core engine 106 and MINT engine. The MINT service 310 can orchestrate schema inferences by requesting automatic schema detection from sample data files. The MINT service 310 manages artifact creation by processing enriched metadata and generating schema artifacts. The MINT service 310 can also coordinate the merging of multiple schema sources into unified templates by combining data from various sources, such as Excel files. The MINT service 310 can be configured to manage schema submission workflows coordinating final artifact registration with MINT engine 108.

Integration methods between the DPX core engine 106 and MINT engine 108 can support multiple workflow patterns. A sample data upload method can transmit files to MINT engine 108 for automatic schema inference. A direct schema registration method can, for example, handle Avro schema submission for pre-defined schemas. A version-specific schema retrieval method can fetch schemas for validation against incoming data. A version tracking management method monitors all artifact versions within an asset for evolution tracking. An asset update operation method can synchronize enriched schema metadata between the DPX core engine 106 and MINT engine 108.

FIG. 4 illustrates details of an exemplary configuration of the MINT engine 108, which coordinates with elements of the DPX core engine 106 for automated schema processing and inference. As already discussed, the DPX core engine 106 coordinates interactions between the asset service 304 of the DPX core engine 106 and the MINT engine 108 to automatically determine data contracts and schemas from external platforms, enabling automated code generation for data movement without manual programming.

The exemplary MINT engine 108 selectively interacts with the data pipeline to infer a schema of metadata when metadata is present in the data pipeline. The MINT core engine 402 is configured (i.e., programmed) to selectively receive metadata describing input data provided by a user at the user interface 104. The MINT core engine 402 is configured to evaluate whether the metadata is suitable for a template in spreadsheet format. The MINT core engine 402 provides schema processing orchestration by routing metadata unsuitable for a template in spreadsheet format to a schema inference engine 404, and routing metadata suitable for a template in spreadsheet format to a template generator 406. The MINT core engine 402 manages inference workflows requesting automatic schema detection from sample data from a data pipeline. In exemplary embodiments, MINT core engine 402 manages these inference workloads by coordinating with the schema inference engine to analyze uploaded files. The MINT core engine 402 coordinates validation workflows ensuring schema integrity and compatibility after schema inference. The MINT core engine 402 orchestrates registration workflows storing versioned schema artifacts in a schema repository 412. In exemplary embodiments, the MINT core engine 402 is configured to automatically configure extraction flags, validation settings, and Raw-to-Conformed (R2C) defaults for efficient processing.

The exemplary schema inference engine 404 performs multi-format analysis to infer a schema of the metadata. These formats included in the multi-format analysis include metadata in any format, including but not limited to JavaScript Object Notation (JSON), Extensible Markup Language (XML), comma separated format (CSV), columnar storage format, JavaScript Object Notation Lines (JSONL), and spreadsheet formats. The schema inference engine 404 can, for example, implement JSON service for JSON inference with a nested structure analysis identifying hierarchical data patterns. The schema inference engine 404 can implement XML service for XML inference with hierarchical processing analyzing XML element structures. The schema inference engine 404 can implement delimited service for CSV inference with delimiter detection identifying column structures and data types. The schema inference engine 404 can implement a columnar storage service for columnar storage format inference with columnar analysis extracting schema from binary formats. The schema inference engine 404 can implement JSONL service for JSONL inference with line-delimited JSON handling processing newline-separated JSON records. The schema inference engine 404 supports spreadsheet formats (such as XLSX, CSV, and other spreadsheet formats) for schema inference from spreadsheet-based data sources. In an exemplary embodiment, the schema inference engine 404 is configured to perform deep analysis of nested objects, arrays, and tabular structures understanding complex data patterns.

The exemplary template generator 406 creates user-friendly output templates for business user interaction. The template generator 406 generates templates in spreadsheet format including intelligent suggestions for table names, column names, and data types based on analyzed data structures. Analysis of the data structures includes nested path analysis of hierarchical data structures. The intelligent suggestions include suggestions based on actual data patterns identified through intelligent data analysis. In exemplary embodiments, the intelligent suggestions are business-friendly names suitable for non-technical users. The template generator 406 can create spreadsheet files in spreadsheet format (such as XLSX, CSV, and other spreadsheet formats) with SUGGESTED_TABLE_NAME recommendations for table organization. The template generator 406 populates SUGGESTED_COLUMN_NAME and SUGGESTED_DATA_TYPE recommendations for field definitions. The template generator 406 can be configured to incorporate business context from domain attributes and governance metadata enriching suggestions with organizational knowledge. In exemplary embodiments, the domain attributes are stored in a domain registry including business unit domain identifiers, designations identifying use of data in production or non-production environments, and access level permissions. In exemplary embodiments, the governance metadata includes ownership information and business glossary terminology. Incorporating this context enables business users to enrich metadata without technical complexity while maintaining both technical schema information and business metadata. In an exemplary embodiment, the template generator 406 is configured to implement audit column injection automatically adding an ingestion identifier, ingestion timestamp, and fine name columns for data lineage tracking.

An exemplary schema validation engine 408 performs structure and compatibility checks on all schema submissions received from the schema inference engine 404 to ensure data integrity.

The schema validation engine 408 is configured to ensure schema integrity validating structural correctness and completeness. The schema validation engine 408 can validate data type consistency checking field types against defined standards. The schema validation engine 408 can check field structure correctness ensuring proper naming and organization. The schema validation engine 408 can verify evolution compatibility across versions and environments using forward compatibility, backward compatibility, and full compatibility modes.

An exemplary schema registration manager 410 manages versioned artifacts in the schema registry providing centralized schema storage. The schema registration manager 410 can store the schema in a schema repository 412 including one or more schema registries such as schema registry 414. The schema repository can include a Template Registry 416 configured to store templates generated by the template generator 406. The schema registration manager 410 can maintain artifact metadata including group identifiers and artifact identifiers for unique identification. This method of identification allows artifact metadata to be maintained in an organized and accessible manner. The schema registration manager 410 can track version history recording changes made to the schema. A schema registration manager 410 can ensure proper schema evolution through the registration lifecycle managing compatibility and versioning rules.

Figure 5:
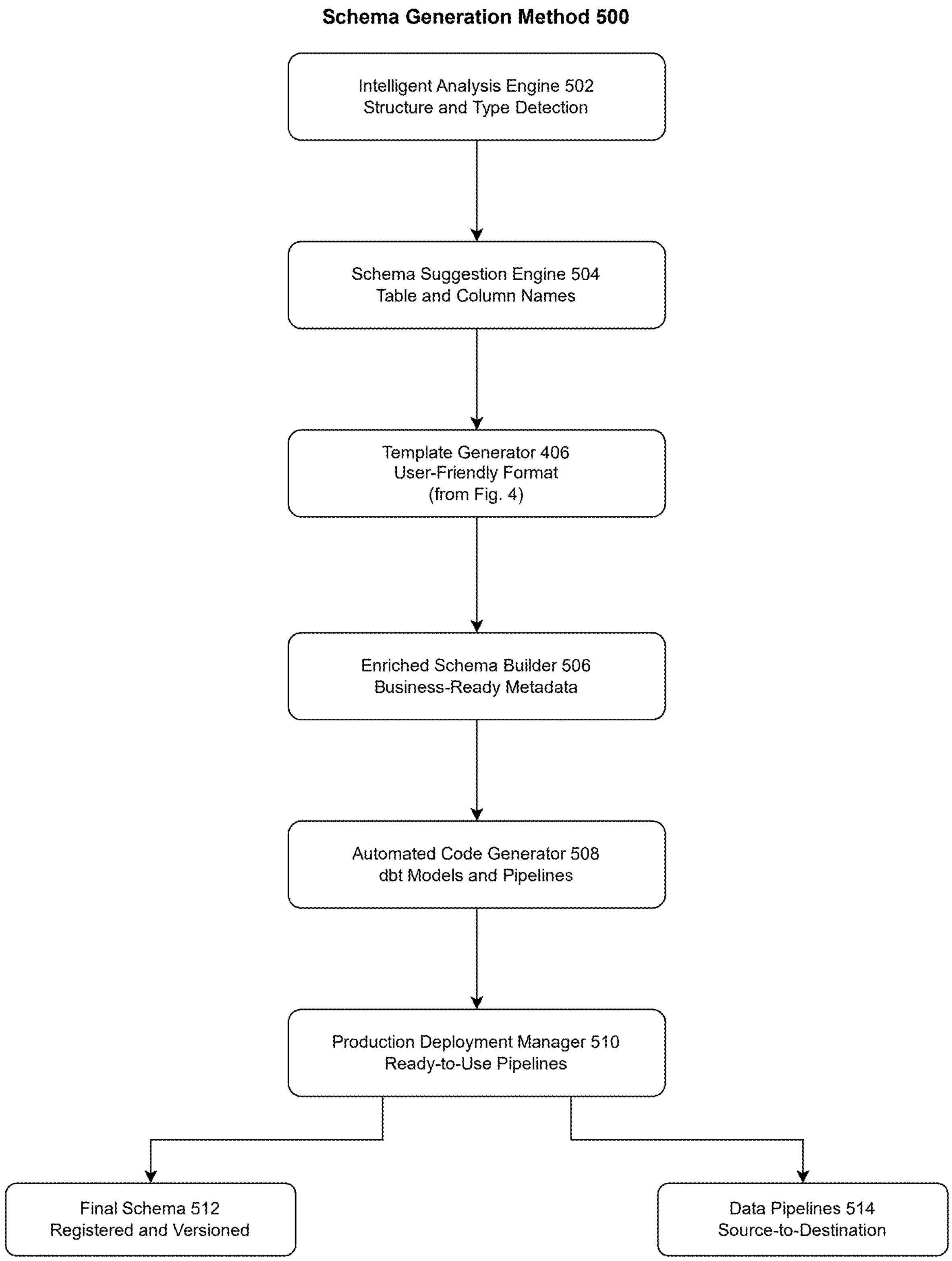
FIG. 5 illustrates a flow diagram for an exemplary novel schema generation method, wherein the MINT engine generates schemas from various data inputs through enhanced intelligent analysis and novel template creation.

FIG. 5 shows an exemplary schema generation method 500 for the FIG. 1 system which includes an intelligent analysis engine 502 for providing structure and type detection for incoming data enabling automatic schema inference, and supporting file uploads from the user interface 104 through asset service 304 (e.g., user-uploaded sample data). The FIG. 1 system supports direct API uploads to the MINT engine 108 from external clients requiring programmatic schema generation. The MINT engine of the FIG. 1 system supports domain registry integration for existing domain schemas enabling schema reuse. The FIG. 1 system supports asset environment promotion for cross-environment schema management ensuring consistency. The FIG. 1 system performs multi-format detection automatically spreadsheet formats including but not limited to XLSX or CSV. The FIG. 1 system can perform deep analysis of nested objects, arrays, and tabular structures understanding complex data patterns.

FIG. 5 includes a schema suggestion engine 504 which generates table and column name recommendations providing intelligent naming guidance and/or intelligent suggestions including SUGGESTED_TABLE_NAME for table organization, SUGGESTED_COLUMN_NAME for field naming, and SUGGESTED_DATA_TYPE for type classification. The schema suggestion engine 504 can perform data type inference for string, number, and Boolean types. The FIG. 1 system performs data type inference for date and custom types. The FIG. 1 system provides column mapping with business attribute mapping and intelligent suggestions for field relationships. The FIG. 1 system implements audit column injection automatically adding INGESTION_ID (Ingestion Identifier), INGESTION_TS (Ingestion Timestamp), and FILE_NAME columns for data lineage tracking.

In the exemplary schema generation method 500 of FIG. 5, the template generator 406 from the exemplary MINT engine 108 depicted in FIG. 4 creates user-friendly format templates for business user interaction, and populates templates with pre-populated intelligent suggestions based on analyzed data structures. The template generator 406 implements business context integration incorporating domain registry business attributes enriching templates with organizational metadata. The template generator 406 can implement R2C defaults population automatically configuring extraction flags and validation settings for efficient processing. The template generator 406 can enable business users to enrich metadata without technical complexity providing accessible schema management.

In the exemplary schema generation method 500 of FIG. 5, an enriched schema builder 506 produces business-ready metadata, combining system generated suggestions with user-provided business context. The enriched schema builder 506 provides comprehensive lifecycle management for schema artifacts. The enriched schema builder 506 can include artifact ID generation with intelligent GroupId and ArtifactId creation for unique identification. The enriched schema builder 506 includes version control through schema registry system integration tracking schema evolution. The enriched schema builder 506 includes schema compatibility check for forward compatibility, backward compatibility, and full compatibility validation. The enriched schema builder 506 can include metadata enrichment with properties and labels providing complete documentation. The enriched schema builder 506 can include version deployment tracking for Source-to-Raw (S2R) and Raw-to-Conformed (R2C) pipeline status monitoring, thereby ensuring deployment visibility.

In the exemplary schema generation method 500 of FIG. 5, an automated code generator 508 creates pipelines automatically from enriched schema metadata. The automated code generator 508 can generate complete transformation code without manual programming. The automated code generator 508 can create custom transformation macros for reusable logic enabling code modularity. An exemplary automated code generator 508 implements dynamic query generation with context-aware code creation adapting to data structures. The automated code generator 508 can generate quality test code for validation ensuring data integrity during transformation.

In the exemplary schema generation method 500 of FIG. 5, a production deployment manager 510 creates ready-to-use pipelines with complete automation for production environments. The production deployment manager 510 can provide automated CI/CD integration coordinating with a variety of third-party development platforms including but not limited to Azure DevOps. The production deployment manager 510 can implement schedule configuration enabling automated job execution. The production deployment manager 510 can provide catalog integration for lineage tracking maintaining complete data provenance. The production deployment manager 510 can implement quality gate setup for validation workflows ensuring data quality before production release.

In the exemplary schema generation method 500 of FIG. 5, a final schema 512 represents the registered and versioned schema artifact providing the authoritative schema definition. The final schema 512 is stored in schema registry systems such as the schema registry 414 thereby maintaining centralized schema storage. The final schema 512 can include complete version history tracking of all schema changes and evolution. The final schema 512 can include compatibility tracking ensuring proper schema evolution across environments.

In the exemplary schema generation method 500 of FIG. 5, data pipelines 514 provide source-to-destination data movement with complete orchestration and processing via the data pipeline management of the DPX core engine 106 and the orchestration engine 106. The data pipelines 514 can be configured to coordinate through the orchestration engine 116 managing workflow scheduling and execution. The data pipelines 514 process through appropriate engines. As shown in FIG. 7, these appropriate engines can, for example, include an engine for batch processing 708 and an engine for stream processing 710. A transformation engine 712 can provide raw to conformed data transformation usable, for example, by a lineage engine 706 of the DataHub 110. The data pipelines 514 deliver data to central storage 126 for data lake storage and business-ready storage 128 for subsequent use such as analytical processing.

In FIG. 5, the exemplary schema generation method 500 allows the MINT engine 108 to generate schemas from various data inputs through intelligent analysis and template creation as described herein. The method 500 includes the intelligent analysis engine 502 which provides data structure and type detection, the schema suggestion engine 504 for table and column names, the template generator 406, the enriched schema builder 506 for providing business-ready metadata, an automated code generator 508 (e.g., dbt models and pipelines), and the production deployment manager 510 for providing ready-to-use pipelines, with outputs to a final schema 512 for a data pipeline 514 (source-to-destination).

Referring now to FIG. 6, details of an exemplary schema validation algorithm 600 are shown to illustrate an exemplary comprehensive real-time validation process that provides data integrity, compatibility, and compliance during automated data movement and transformation workflows, including advanced security operations for data masking, encryption, and decoding.

In the exemplary schema validation algorithm 600 of FIG. 6, a schema retrieval service 602 obtains registered schema from MINT engine 108 for incoming data validation. The schema retrieval service 602 retrieves schemas, for example version-specific Avro schemas, for precise validation against registered definitions. The schema retrieval service 602 can query any or all artifact versions within an asset for complete version visibility. The schema retrieval Service 602 can perform schema compatibility validation across environments ensuring consistent schema evolution. The schema retrieval service 602 can coordinate with the MINT service 310 to fetch the appropriate schema version for incoming data validation workflows.

In the exemplary schema validation algorithm 600 of FIG. 6, a structure validation engine 604 performs field and type checking against retrieved schemas ensuring structural correctness. The structure validation engine 604 implements field structure validation validating against retrieved schemas, such as Avro schemas, for schema compliance. The structure validation engine 604 can implement audit column validation verifying INGESTION_ID, INGESTION_TS, and FILE_NAME columns for complete data lineage. The structure validation engine 604 can implement source-specific validation handling external data sources, including but not limited to sources such as Amazon Simple Storage Service (S3) (_file_url), Kafka (record_metadata), and Change Data Capture (CDC) (_operation) metadata fields for source-specific requirements.

In the exemplary schema validation algorithm 600 of FIG. 6, an business rule validation engine 606 implements Payment Card Industry (PCI) masking, and custom logic validation ensuring compliance with organizational policies. The business rule validation engine 606 can perform PCI detection for identifying sensitive payment information. The business rule validation engine 606 can apply custom business rules specific to organizational requirements. The business rule validation engine 606 can validate data classification requirements ensuring proper data handling. The business rule validation engine 606 can check compliance with governance policies before processing, ensuring data meets organizational standards.

In the exemplary schema validation algorithm 600 of FIG. 6, the automated security coordination engine 608 can receive the schema upon rule validation from the business rule validation engine 606. The security validation engine 610 is configured to check encryption and encoding requirements for data protection compliance. The security validation engine 610 can validate business attributes for security classification determining required protection levels. The security validation engine 610 can perform encryption detection and validation for payload encryption ensuring secure data transmission. The security validation engine 610 can assess encoding detection and validation for data format ensuring proper data encoding. The security validation engine 610 can validate field-level encryption compliance for sensitive data protection maintaining security standards.

In the exemplary schema validation algorithm 600 of FIG. 6, the validation decision engine 612 is configured to implement comprehensive decision matrix routing determining appropriate data processing paths based on validation results. The validation decision engine 612 can generate a structure decision for structural integrity of the schema, a compatibility decision for schema evolution assignment, and a data quality decision to ensure quality of data within the schema complies with a given threshold quality metric. The validation decision engine 612 can evaluate business rule decision for compliance verification, pipeline-specific decision for pipeline-specific requirements, and encryption security decision for field-level encryption needs. The validation decision engine 612 can route the schema to a selected security engine on a data pipeline performing a specific security function, the selected security engine selected being based at least in part on the protection levels and associated encryption requirements determined by the security validation engine.

As already discussed, the selected security engine can be one of a plurality of security engines included in the automated security coordination engine 608.

In an exemplary embodiment, the selected security engine is a clean processing handler 614 configured to handle input data that passes validation checks and store input data that passes the validation checks in the homogenized data architecture. Depending on security requirements and governance policies, the clean processing handler 614 can handle standard flow for validated data passing at least one validation check, a predetermined number of selected validation checks, or all validation checks. The clean processing handler 614 can process data that passes the validation checks without requiring security operations. The clean processing handler 614 can route data directly to central storage 126 or business-ready storage 128 for analytical processing enabling immediate availability for downstream consumption. FIG. 6 illustrates an additional secure processing handler 616, a masked processing handler 618 for data protection, an error handler 620 should provide, for example, quarantine and recovery capability. Outputs from the handlers are provided to the homogenized data architecture 124, with outputs from the clean processing handler 614 and the secure processing handler 616 being supplied to a central storage 126 and a business-ready storage 128 which also receives outputs from the masked processing handler 618.

Referring now to FIG. 7, the DataHub 110 of the exemplary FIG. 1 system is configured to automatically capture data lineage from multiple processing engines including, for example, batch processing engines 708, stream processing engines 710, and transformation engines 712. In an exemplary embodiment, the DataHub 110 of system 100 is configured to integrate data quality results into lineage metadata. The DataHub 110 is configured to track data lineage relationships capturing source-to-destination flows along the data pipeline with automatic propagation of business attributes through a lineage graph.

In an exemplary embodiment, the DataHub 110 of FIG. 7 includes a domain registry 702 configured to store domain metadata extracted from the inferred schema. In an exemplary embodiment, the domain registry 702 is configured to divide business domains included in the domain metadata into a hierarchy of subdomains organizing the input data by business units and functions. In an exemplary embodiment, the domain registry 702 is configured to track ownership information identifying owners and/or custodians of the input data; and/or to enforce governance policies requiring proper organization of the input data and domain-based routing of the input data through the data pipeline.

In an exemplary embodiment, the DataHub 110 of FIG. 7 includes a business attributes manager 704 configured to identify and protect sensitive data in the input data. In an exemplary embodiment, the business attributes manager 704 is configured to manage a glossary of standardized terminology to ensure the input data is consistently defined.

In an exemplary embodiment, the DataHub 110 of FIG. 7 includes a lineage engine 706 configured to track data lineage relationships capturing source-to-destination flows of the input data along the data pipeline.

In an exemplary embodiment, the DataHub 110 of FIG. 7 is configured to capture lineage from batch processing engines 708 processing file-based and NoSQL database data. In an exemplary embodiment, the DataHub 110 of system 100 is configured to capture lineage from stream processing engines 710 processing real-time streaming and Change Data Capture (CDC) data. In an exemplary embodiment, the DataHub 110 of system 100 is configured to capture lineage from transformation engines 712 executing generated transformation code. In an exemplary embodiment, the DataHub 110 of system 100 is configured to provide end-to-end lineage from source to consumption across all data zones including raw, conformed, and consumption layers.

Referring back to FIG. 1, the data quality service engine 114 included in the DataHub 110 is configured to perform automated balance control checks across multiple data zones including raw zones, conformed zones, and consumption zones. In an exemplary embodiment, the data quality service engine 114 is configured to validate record counts across zone boundaries during transformations. In an exemplary embodiment, the data quality service engine 114 is configured to perform aggregate balance verification including sums and averages across zone boundaries. In an exemplary embodiment, the data quality service engine 114 is configured to integrate balance control results with data lineage.

Referring now to FIG. 8, the decision engine 802 of the engine selection logic 118 receives input data provided to the data pipeline by a user at the user interface 104. In exemplary embodiments, the decision engine 802 receives the input data via the orchestration engine 116. The decision engine 802 selects a processing engine from a plurality of processing engines based on, for example, one or more characteristics of at least some of the input data characterizing a data source from which the at least some data was received, wherein selection of a processing engine is based at least in part on intelligent data analysis. The decision engine 802 can, for example, analyze source type, Service Level Agreement (SLA) requirements, data volume estimates, processing frequency, security requirements, business attributes, and masking policies to automatically select the processing engine from the plurality of processing engines. The complexity abstraction layer 804 automatically maps user input to engine-specific configurations.

In an exemplary embodiment, the decision engine 802 analyzes source type to determine an appropriate processing approach. In an exemplary embodiment, the decision engine 802 is configured to analyze Service Level Agreement (SLA) requirements, data volume estimates, and processing frequency for performance optimization. In an exemplary embodiment, the decision engine 802 analyzes security requirements and business attributes for data classification to determine the suitable processing approach. The decision engine 802 includes a source type detector for analyzing user input identifying data source characteristics.

In an exemplary embodiment, the decision engine 802 includes an SLA analyzer for evaluating real-time vs batch requirements determining latency constraints. In an exemplary embodiment, the decision engine 802 includes a security analyzer for interpreting business attributes and security policies; and an engine selector configured to automatically choose between a batch processing engine 708 and a stream processing engine 710. In an exemplary embodiment, the decision engine 802 includes an API integration engine 802 based on analysis of source type, Service Level Agreement (SLA) requirements, data volume estimates, processing frequency, and security requirements.

In an exemplary embodiment, the engine selection logic 118 includes a complexity abstraction layer 804 configured to hide technical details from users to provide a simplified interface for data movement operations. In an exemplary embodiment, the complexity abstraction layer 804 is configured to automatically manage all technical configurations without user intervention. In an exemplary embodiment, the complexity abstraction layer 804 is configured to coordinate security operations transparently handling encryption and masking automatically. The complexity abstraction layer 804 handles engine-specific parameters without user involvement, thereby ensuring appropriate processing configuration, wherein users interact through the user interface 104 without having to specify processing engines or technical configuration details, although users can provide any or all of such inputs as desired. In an exemplary embodiment, the complexity abstraction layer 804 implements the security orchestrator for coordinating security operations across processing engines. In an exemplary embodiment, the complexity abstraction layer 804 is configured to implement an encryption/encoding detector for analyzing source data format determining required transformations. In an exemplary embodiment, the complexity abstraction layer 804 is configured to implement a masking policy engine for applying business attribute-driven protection automatically. In an exemplary embodiment, the complexity abstraction layer 804 is configured to implement a security decision matrix for routing security operations automatically based on data classification.

In an exemplary embodiment, the engine selection logic 118 includes the plurality of processing engines, the plurality of processing engines configured to process the at least some data for storage in a homogenized data architecture. In an exemplary embodiment, the plurality of processing engines include a batch processing engine 708 configured for file-based and NoSQL database processing from cloud object storage systems.

In an exemplary embodiment, the plurality of processing engines includes a stream processing engine 710 configured for real-time streaming and Change Data Capture (CDC) processing from event streaming platforms. In an exemplary embodiment, the plurality of processing engines includes an API integration engine 806 configured for external Application Programming Interface (API) integration with third-party data sources.

The data flattening platform 122 is shown in greater detail in FIG. 9, and is configured to analyze metadata received from the MINT to determine possible flattening configurations. In an exemplary embodiment, the intelligent data flattening engine 910 is configured to execute computer code generated by an automated code generator to produce flattened data, wherein the flattened data is based on at least one or more parent-child relationships of hierarchical data structures within the input data identified using intelligent data transformation. In an exemplary embodiment, the data flattening engine platform 122 includes the automated code generator 912, the automated code generator configured to generate a transformation project with configuration files including computer code that when executed by the intelligent data flattening engine 910 will produce flattened data.

In an exemplary embodiment, the automated code generator 912 is configured to generate complete transformation code automatically from enriched metadata using a data transformation tool configured for generating transformed data, such as Structured Query Language (SQL) based transformation models.

In an exemplary embodiment, the data flattening platform 122 of system 100 automatically generates computer code including a complete transformation repository including a transformation project configuration file with environment-specific settings. The complete transformation repository includes one or more data transformation models implementing flattening logic for hierarchical data structures. In an exemplary embodiment, the complete transformation repository includes one or more source configuration files for defining input data sources. In an exemplary embodiment, the complete transformation repository can include one or more macro files containing reusable transformation functions for nested data processing. The complete transformation repository can include one or more test files with data quality validation rules, wherein the complete transformation repository is production-ready for deployment and execution.

In an exemplary embodiment, the data flattening platform 122 of system 100 automatically generates computer code using, for example, a data transformation tool configured for generating Structured Query Language (SQL)-based transformation models, wherein the complete transformation repository includes SQL code for flattening nested data structures into parent and child tables. The data flattening platform 122 of system 100 can implement recursive nested structure processing for deep hierarchies navigating complex nesting levels. In an exemplary embodiment, the data flattening platform 122 of system 100 can implement array and list processing for element extraction converting arrays to table rows, and/or analyze hierarchical data structures within the input data to intelligently identify one or more parent-child relationships. The data flattening platform 122 of system 100 can automatically generate parent tables containing root-level entities extracted from nested data with primary keys for unique identification, and/or automatically generate child tables containing nested array elements extracted from complex structures with foreign key relationships to the parent tables maintaining referential integrity. The data flattening platform 122 of system 100 can preserve business context from metadata in both the parent tables and child tables. The data flattening platform 122 can automatically integrate the complete transformation repository within a continuous integration and continuous deployment (CI/CD) pipeline including repository template cloning for establishing baseline transformation foundations.

In an exemplary embodiment, the CI/CD pipeline includes CI/CD pipeline generation for creating deployment templates for automated deployment workflows. In an exemplary embodiment, the CI/CD pipeline includes a schedule configuration component for automated job scheduling. The CI/CD pipeline can include quality gate setup with automated testing workflows for ensuring code quality before deployment.

In an exemplary embodiment, the intelligent data flattening engine 910 is configured to produce the flattened data using recursive array processing algorithms, and/or to implement recursive nested structure processing for deep hierarchies navigating complex nesting levels. The intelligent data flattening engine 910 can implement array and list processing for element extraction converting arrays to table rows. The data flattening engine is configured to implement cross-format compatibility for a variety of data formats including but not limited to JavaScript Object Notation (JSON) and Extensible Markup Language (XML) applying unified flattening approaches. Business context preservation is implemented while flattening technical structures for maintaining semantic meaning. In an exemplary embodiment, the intelligent data flattening engine 910 is configured to, for example, implement cross-format compatibility for JavaScript Object Notation (JSON) and Extensible Markup Language (XML) applying unified flattening approaches. The intelligent data flattening engine 910 is configured to analyze enriched metadata to determine flattening configurations including parent-child table relationships with automatic join key propagation.

In an exemplary embodiment, the automated code generator 912 is configured to, for example, implement a Structured Query Language (SQL) generation engine delivering root and standard SQL generation based on enriched metadata and flattening configurations. In such cases, the template generator 406 is configured to analyze nested structures to recommend suitable table decomposition strategies. These decomposition strategies can include suggestions for how to break complex structures into parent tables 916 and child tables 918 enabling normalized data access.

Referring back to FIG. 1, the DataHub 110 of system 100 includes a data quality service engine 114 configured to provide one or more quality metrics for the schema inferred by the MINT from input data received at the user interface. The data quality service engine 114, implemented on a data quality platform, is illustrated in FIG. 10.

Figure 10:
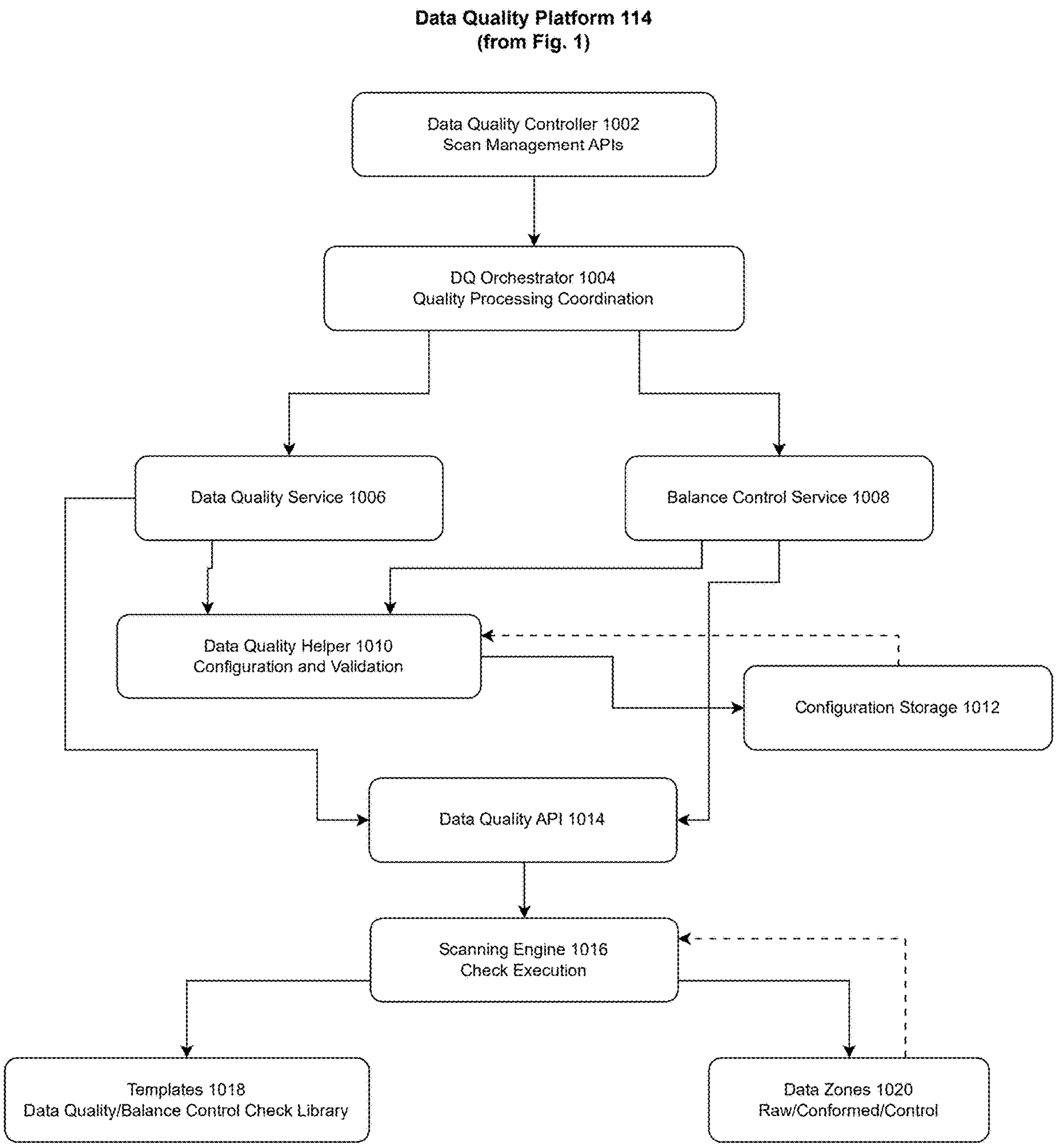
FIG. 10 illustrates an exemplary integration of the data governance and lineage platform's data quality service engine with external quality platform services, thereby providing automated, enhanced quality monitoring and balance control.

In FIG. 10, the data quality service engine 114 of DataHub 110 includes a data quality controller 1002 to scan management ADI, a data quality orchestrator 1004 for quality processing coordination via a data quality service 1006 and a balance control service 1008, both of which collaborate with a data quality-helper 1010 for configuration and validation and with a data quality guide 1014. The data quality helper 1010 can interface with a configuration storage 1012. The data quality API 1014 provides outputs to a scanning engine 1016 to perform a check execution before data is supplied to templates 1018 and data zones 1020.

Figure 11:
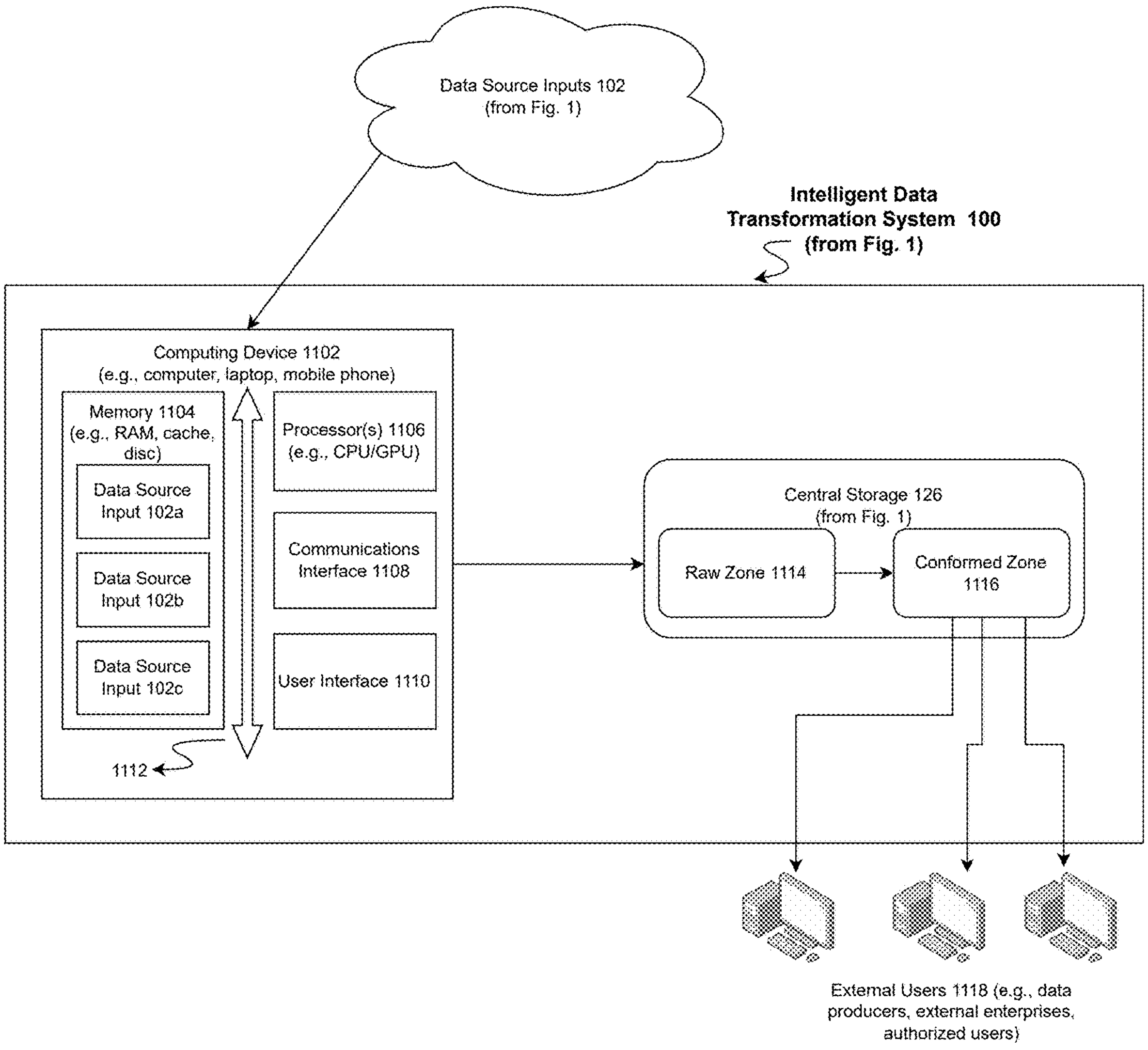
FIG. 11 illustrates an exemplary computing device performing the functions of the intelligent data transformation system.

FIG. 11 depicts an exemplary configuration of the intelligent data transformation system 100 of FIG. 1. In some embodiments, one or more data source inputs 102 can transmit a plurality of data source inputs 102*a*, 102*b*, and 102*c* to a computing device 1102.

In some embodiments, such systems or devices in various figures described herein can include at least one computing device 1102 and/or at least one component of computing device 1102. The number and arrangement of components shown in FIG. 11 are provided as an example. In some embodiments, computing device 1102 can include additional components, fewer components, different components, or differently arranged components than those shown in FIG. 11. Additionally, or alternatively, a set of components (e.g., one or more components) of computing device 1102 can perform one or more functions described as being performed by another set of components of computing device 1102. The computing device 1102 includes but is not limited to a desktop computer, a laptop computer, or a mobile phone.

Computing device 1102 can include memory 1104, processor(s) 1106, communications interface 1108, and I/O interface 1110. Memory 1104 can be configured to store the plurality of data source inputs 102*a*, 102*b*, and 102*c* received from the one or more data source inputs 102. Memory 1104 can be configured for storing program code. Memory 1104 can include one or more memory devices such as volatile or non-volatile memory. For example, the volatile memory can include RAM or cache memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). Data stored in on the computing device 1102 of the intelligent data transformation system 100 can be stored on any type of suitable computer readable media, such as optical storage (e.g., a compact disc, digital versatile disc, Blu-ray disc, etc.) or magnetic tape storage (e.g., a hard disk drive). The stored data can include network traffic data, log data, streaming events, and/or CDRs generated and/or accessed by processor(s) 1106, and software or program code used by processor(s) 1106 for performing the tasks associated with the exemplary embodiments described herein. The data can be configured in any type of suitable database configuration, such as a relational database, a structured query language (SQL) database, a distributed database, an object database, etc. Suitable configurations and storage types will be apparent to persons having skill in the relevant art.

Processor(s) 1106 can be configured for executing the program code stored in memory 1106. Processor(s) 1106 can be a special purpose or a general purpose computing device encoded with program code or software for performing the exemplary functions and/or features disclosed herein. For example, the processor(s) 1106 can perform the functions of the exemplary embodiments of the components depicted in FIGS. 1 through 10. In some embodiments, the plurality of data source inputs 102*a*, 102*b*, and 102*c* stored in memory 1104 are processed by processor(s) 1106 such that they are suitable for storage in the central storage unit 126 of the homogenized data architecture 124 depicted in FIG. 1. According to exemplary embodiments of the present disclosure, processor(s) 1106 can include a CPU or GPU. The processor(s) 1106 can be connected to the communications interface 1112 including a bus, message queue, or network, multi-core message-passing scheme, for communicating with other components of computing device 1102, such as memory 1104, communications interface 1108, and I/O interface 1110. The processor(s) 1106 can include one or more processors such as a microprocessor, microcomputer, programmable logic unit, or any other suitable hardware computing devices as desired.

Communications interface 1108 can include a transceiver-like component (e.g., a transceiver, a receiver, a transmitter, a separate receiver and transmitter pair, etc.) that enables computing device 1102 to communicate with other devices, such as via a wired connection, a wireless connection, or a combination of wired and wireless connections. Communication interface 1108 can permit computing device 1102 to receive information from another device and/or provide information to another device. For example, communication interface 1108 can include an Ethernet interface, an optical interface, a coaxial interface, an infrared interface, a RF interface, a universal serial bus (USB) interface, a Wi-Fi® interface, a cellular network interface, and/or the like.

I/O interface 1110 can be configured to receive the signal from processor(s) 1106 and generate an output suitable for a peripheral device via a direct wired or wireless link. I/O interface 1110 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The exemplary computing device 1102 can process the plurality of data source inputs 102*a*, 102*b*, and 102*c* received from the one or more data source inputs 102 and stored in memory 1104 using the processor(s) 1106 such that the resultant data is suitable for storage in central storage 126. The central storage unit can include a raw zone 1114 and a conformed zone 1116. In some embodiments, the data received from the exemplary computing device can be initially stored in raw zone 1114 and transformed via a database transformation engine for storage in the conformed zone 1116. Data stored in the conformed zone can be accessed via database queries (e.g., SQL queries) by external users 1118. These external users include but are not limited to data producers, external enterprises, authorized users, or licensed organizations.

It will be apparent to those skilled in the art that numerous modifications and variations of the described examples and embodiments are possible considering the above teachings of the disclosure. The disclosed examples and embodiments are presented for purposes of illustration only. Other alternate embodiments can include some or all of the features disclosed herein.

A person having ordinary skill in the art will appreciate that embodiments of the disclosed subject matter, and any components discussed herein, can be practiced with various computer system configurations, including multi-core multiprocessor systems, minicomputers, mainframe computers, emulated processor architectures, computers linked or clustered with distributed functions, as well as pervasive or miniature computers that can be embedded into virtually any device. For instance, at least one processor device and a memory can be used to implement the above-described embodiments.

A hardware processor device as discussed herein may be a single hardware processor, a plurality of hardware processors, or combinations thereof. Hardware processor devices may have one or more processor "cores." A hardware processor may include and/or implement software and firmware components. The terms "service", "engine", "platform", "manager", "logic", "layer", and "processor" as used herein can be implemented using a hardware processor device and/or can be implemented as a combination of a hardware processor with software and/or firmware. One of ordinary skill in the art would recognize that the functions of the exemplary intelligent data transformation system can be executed by any number of hardware processors or processor "cores." The term "non-transitory computer readable medium" as discussed herein is used to generally refer to tangible media such as a memory device. The hardware processor may or may not have an RF front-end integrated with it—that is, the processing of collected data may occur either in the device with the antenna directly attached to it, or on another processor device operating on previously collected signal data.

After reading this description, it will become apparent to a person skilled in the relevant art how to implement the present disclosure using other computer systems and/or hardware architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The hardware processors disclosed herein can be a general purpose processor device configured with program code for performing the methods and/or method steps according to the exemplary embodiments. Any general purpose processor in the context of the disclosed embodiments can also be deemed a special purpose device, respectively. The hardware processor device can be connected to a communications infrastructure, such as a bus, message queue, network, multi-core message-passing scheme, etc. The network can be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, RF, or any combination thereof. Other suitable network types and configurations will be apparent to persons having skill in the relevant art. The computing devices disclosed herein can also include memory (e.g., random access memory, read-only memory, etc.) and may also include one or more additional memories. The memory and the one or more additional memories may be read from and/or written to in a well-known manner. In an embodiment, the memory and the one or more additional memories may be non-transitory computer readable recording media.

According to an exemplary embodiment of the present disclosure, data stored in a computing device (e.g., in the memory) may be stored on any type of suitable computer readable media, such as optical storage (e.g., a compact disc, digital versatile disc, Blu-ray disc, etc.), magnetic tape storage (e.g., a hard disk drive), or solid-state drive. Any operating system for any processor or engine can be stored in the memory.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The computing devices disclosed herein may also include an RF interface path capability. The RF interface path may be configured to allow software and data to be transferred between the computing device and any external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

Memory semiconductors (e.g., DRAMs, etc.) are suitable devices for providing software to the computing device. Computer programs (e.g., computer control logic) may be stored in the memory. Computer programs may also be received via the communications interface. Such computer programs, when executed, may enable computing device to implement the present methods as discussed herein. In particular, the computer programs stored on a non-transitory computer-readable medium, when executed, may enable hardware processor device to implement the functions/methods disclosed herein, or similar methods as desired. Accordingly, such computer programs may represent controllers of the computing device. Where the present disclosure is implemented using software, the software may be stored in a computer program product or non-transitory computer readable medium and loaded into the computing device using a removable storage drive or communications interface.

The computing device may also include a transceiver which performs functions pertaining to analog to digital signal conversion. The computing device may also include an RF front end which performs RF signal processing functions on an RF signal. The computing device may also contain a power device which powers the device to perform its designated functions.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that "A" alone may be present in an embodiment, "B" alone may be present in an embodiment, "C" alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

Therefore, it is the intent to cover all such modifications and alternate embodiments as may come within the true scope of this invention, which is to be given the full breadth thereof. It should be understood that modifications to the embodiments disclosed herein can be made to meet a particular set of design criteria. Therefore, while certain exemplary embodiments of the systems and methods using and making the same disclosed herein have been discussed and illustrated, it is to be distinctly understood that the invention is not limited thereto but may be otherwise variously embodied and practiced within the scope of the following claims.

TECHNICAL ADVANTAGES

The intelligent data transformation system 100 of FIG. 1 presents a number of technical advantages reducing the number of manual data transformation and movement tasks and the associated errors resulting from human intervention. For example, the engine selection logic 118 of the exemplary data transformation system 100 depicted in FIG. 1 employs intelligent data analysis to automatically identify the type of input data present in a data pipeline and route the input data to a selected processing engine specifically configured to handle said type. The dynamic identification of data type (e.g., batch data vs. streaming data) and tailored processing depart from known prior art techniques wherein data, regardless of type, is processed by a general processing engine. Thus, the intelligent data analysis not only reduces the need for manual data type classification but also mitigates and/or eliminates costly processing bottlenecks by matching data with suitable processing engines thereby improving the processing efficiency of the intelligent data transformation system. Moreover, in using the disclosed intelligent data analysis to perform the engine selection automatically, the engine selection logic reduces the complexity of the intelligent data transformation system by removing the need for users or data engineers to understand engine-specific technical details. This automation can improve the usability of the intelligent data transformation system while reducing or eliminating configuration errors associated with manual engine selection.

Additionally, the metadata integration schema engine 108 of FIG. 4 is equipped with a schema inference engine 404 that automatically infers a schema for each format of metadata within multi-format metadata. This inference requires the schema inference engine 404 to distinguish between different formats of metadata and evaluate the structural characteristics of the data described by the metadata. By performing automatic schema inference, the schema inference engine 404 both reduces and/or eliminates the need for manual schema definition and mitigates the errors caused by user-specified configurations. Additionally, by facilitating automatic processing of diverse metadata formats, the MINT engine 108 can perform multi-format schema inference without requiring format-specific manual configuration. The automation of schema inference for multi-format metadata using classification models (e.g., technical algorithms) and/or predefined rules improves the data processing accuracy of the intelligent data transformation system relative to prior art solutions by reducing schema definition errors associated with manual schema definition and format configuration.

Furthermore, the data flattening platform 122 of FIG. 9 employs intelligent data transformation to automatically identify hierarchical, nested dependencies within data and automatically generate code to resolve these dependencies into separate parent and child tables. Not only do the specific technical algorithms implementing the intelligent data transformation improve how computers process hierarchical data, but the automatically generated computer code also reduces and/or eliminates the need for manual code writing altogether. This both reduces code generation errors and improves data processing efficiency. In performing this flattening, the resultant data is suitable for storage in a homogenized data architecture with query functionality (e.g., via SQL queries) allowing authorized users and data producers to access said data in a uniform and structured manner. This improves the accessibility to enterprise data over systems wherein user-configured flattening algorithms yield heterogeneous dataset structures that are unsuitable for storage in query-compliant (e.g., SQL) database.

What is claimed is:

1. An intelligent data transformation system for intelligent transformation of data received from diverse computing platforms into a homogenized data architecture, the system comprising:

one or more hardware processors and one or more memories coupled to the one or more hardware processors, the one or more hardware processors configured to implement:

a user interface including one or more application programming interfaces (APIs), the user interface configured to:

receive plural data source inputs including one or more security credentials and one or more sample datasets, and manage movement of data from the plural data source inputs within the intelligent data transformation system;

a data production experience (DPX) core engine configured to perform intelligent data transformation, the DPX core engine including a pipeline orchestration engine configured to interface with the APIs to coordinate data movement workflow from the plural data source inputs along a data pipeline;

engine selection logic configured to select a processing engine from a plurality of processing engines based on one or more characteristics of at least some data in the data pipeline characterizing a data source from which the at least some data was received, wherein selection of a processing engine is based at least in part on intelligent data analysis;

a metadata integration schema engine (MINT) configured to selectively interact with the data pipeline to infer a schema of metadata when metadata is present in the data pipeline; and a data flattening platform connected to the data pipeline and configured to:

receive and process input data from a selected processing engine and from the MINT to generate computer code that when executed will produce flattened data, wherein the flattened data is based on at least one or more parent-child relationships of hierarchical data structures within the input data identified using intelligent data transformation;

execute the computer code to produce the flattened data, and store the flattened data in a homogenized data architecture accessible by the user interface.

2. The intelligent data transformation system of claim 1, wherein the data flattening platform is configured to automatically generate computer code comprising a complete transformation repository including:

a transformation project configuration file with environment-specific settings;

one or more data transformation models implementing flattening logic for hierarchical data structures;

one or more source configuration files defining input data sources;

one or more macro files containing reusable transformation functions for nested data processing; and one or more test files with data quality validation rules, wherein the complete transformation repository is production-ready for deployment and execution.

3. The intelligent data transformation system of claim 2, wherein the data flattening platform is configured to automatically generate the computer code using a data transformation tool configured for generating Structured Query Language (SQL)-based transformation models, wherein the generated transformation repository includes SQL code for flattening nested data structures into parent and child tables.

4. The intelligent data transformation system of claim 2, wherein the data flattening platform is configured to automatically integrate the generated transformation repository with a continuous integration and continuous deployment (CI/CD) pipeline, including:

repository template cloning for establishing baseline transformation foundations;

CI/CD pipeline generation creating deployment templates for automated deployment workflows;

schedule configuration for automated job scheduling; and quality gate setup with automated testing workflows ensuring code quality before deployment.

5. The intelligent data transformation system of claim 1, wherein the data flattening platform is configured to:

analyze hierarchical data structures within the input data to intelligently identify one or more parent-child relationships;

automatically generate parent tables containing root-level entities extracted from nested data with primary keys for unique identification;

automatically generate child tables containing nested and array elements extracted from complex structures with foreign key relationships to the parent tables maintaining referential integrity; and preserve business context from metadata in both the parent tables and child tables.

6. The intelligent data transformation system of claim 5, wherein the data flattening platform is configured to implement recursive nested structure processing for deep hierarchies navigating complex nesting levels, and wherein the data flattening platform is configured to implement array and list processing for element extraction converting arrays to table rows.

7. The intelligent data transformation system of claim 5, wherein the data flattening platform is configured to implement cross-format compatibility for JavaScript Object Notation (JSON) and Extensible Markup Language (XML) applying unified flattening approaches, and wherein the data flattening platform is configured to implement business context preservation while flattening technical structures maintaining semantic meaning.

8. The intelligent data transformation system of claim 1, wherein the DPX core engine is configured to automatically coordinate security operations including encryption, decryption, and business-attribute-driven masking based on business attributes received from a data governance system, wherein the DPX core engine is configured to intelligently route data to a clean processing path, a secure processing path, or a masked processing path based on results from validation of the data.

9. The intelligent data transformation system of claim 8, wherein the DPX core engine is configured to:
- validate business attributes for security classification determining required protection levels;
- apply masking policies based on business attributes determining required protection levels; and
- enforce raw and conformed zone masking rules ensuring consistent protection across data zones.

10. The intelligent data transformation system of claim 8, wherein the DPX core engine is configured to automatically determine security requirements from business attributes received from a data catalog platform, wherein the business attributes include data classification information from a business glossary, and wherein the DPX core engine applies masking dynamically based on business context from governance systems without manual security configuration.

11. The intelligent data transformation system of claim 1, wherein the engine selection logic comprises a complexity abstraction layer configured to:
- hide technical details from users to provide a simplified interface for data movement operations;
- automatically manage all technical configurations without user intervention;
- coordinate security operations transparently handling encryption and masking automatically; and
- handle engine-specific parameters without user involvement ensuring appropriate processing configuration, wherein users interact through the user interface without specifying processing engines or technical configuration details.

12. The intelligent data transformation system of claim 11, wherein the engine selection logic further comprises a decision engine configured to analyze source type, Service Level Agreement (SLA) requirements, data volume estimates, processing frequency, security requirements, business attributes, and masking policies to automatically select the processing engine from the plurality of processing engines, and wherein the complexity abstraction layer automatically maps user input to engine-specific configurations.

13. The intelligent data transformation system of claim 1, wherein the MINT is configured to generate user-friendly spreadsheet templates in spreadsheet format pre-populated with intelligent suggestions for table names, column names, and data types based on analyzed data structures, wherein the templates integrate business context from domain governance systems enabling business users to enrich metadata without technical complexity.

14. The intelligent data transformation system of claim 13, wherein the MINT is configured to:
- populate the spreadsheet templates with SUGGESTED_TABLE_NAME recommendations for table organization;
- populate the spreadsheet templates with SUGGESTED_COLUMN_NAME and SUGGESTED_DATA_TYPE recommendations for field definitions;
- automatically configure extraction flags, validation settings, and Raw-to-Conformed (R2C) defaults for efficient processing; and
- incorporate business context from domain attributes and governance metadata enriching suggestions with organizational knowledge.

15. The intelligent data transformation system of claim 1, comprising a data governance and lineage integration platform configured to:
- automatically capture data lineage from multiple processing engines including batch processing engines, stream processing engines, and transformation engines;
- integrate data quality results into lineage metadata; and
- track data lineage relationships capturing source-to-destination flows along the data pipeline with automatic propagation of business attributes through the lineage graph.

16. The intelligent data transformation system of claim 15, wherein the data governance and lineage integration platform is configured to:
- capture lineage from batch processing engines processing file-based and NoSQL database data;
- capture lineage from stream processing engines processing real-time streaming and Change Data Capture (CDC) data;
- capture lineage from transformation engines executing generated transformation code; and
- provide end-to-end lineage from source to consumption across all data zones including raw, conformed, and consumption layers.

17. The intelligent data transformation system of claim 1, further comprising a data governance and lineage integration platform (DataHub) including:
- a data quality service engine configured to provide one or more quality metrics for a schema inferred by the MINT from input data received at the user interface;
- a domain registry configured to: store domain metadata extracted from the inferred schema, divide business domains included in the domain metadata into a hierarchy of subdomains organizing the input data by business units and functions, track ownership information identifying owners and/or custodians of the input data, and enforce governance policies requiring proper organization of the input data and domain-based routing of the input data through the data pipeline; and
- a business attributes manager configured to: identify and protect sensitive data in the input data, and manage a glossary of standardized terminology to ensure the input data is consistently defined; and
- a lineage engine configured to track data lineage relationships capturing source-to-destination flows of the input data along the data pipeline.

18. The intelligent data transformation system of claim 17, comprising: an automated security coordination engine including:
- a security validation engine configured to determine protection levels and associated encryption requirements for a schema inferred by the MINT from the input data;

a validation decision engine configured to: generate a structure decision for structural integrity of the schema, a compatibility decision for schema evolution assignment, and a data quality decision to ensure quality of data within the schema complies with a given threshold quality metric, and route the schema to a selected security engine on the data pipeline performing a specific security function, the selected security engine selected based at least in part on the protection levels and associated encryption requirements determined by the security validation engine; and the selected security engine including at least one processing handler configured to: handle input data that passes validation checks and store input data that passes the validation checks in the homogenized data architecture, handle encryption functions in accordance with the protection levels and associated encryption requirements determined by the security validation engine, mask sensitive information within the input data in accordance with the protection levels determined by the security validation engine, and quarantine compromised data within the input data from uncompromised data within the input data and recover original data from the compromised data.

19. The intelligent data transformation system of claim 1, wherein the MINT is configured to generate intelligent suggestions for table names and column names derived from nested path analysis of hierarchical data structures, wherein the intelligent suggestions are based on actual data patterns identified through intelligent data analysis, and wherein the intelligent suggestions are business-friendly names suitable for non-technical users.

20. The intelligent data transformation system of claim 19, wherein the MINT is configured to analyze nested structures to recommend suitable table decomposition strategies, and wherein the MINT is configured to suggest how to break complex structures into parent tables and child tables enabling normalized data access.

21. The intelligent data transformation system of claim 1, wherein the MINT is configured to automatically enrich an inferred schema with business context from domain governance systems, wherein the business context includes domain attributes, ownership information, and business glossary terminology, and wherein the enriched schema maintains both technical schema information and business metadata.

22. The intelligent data transformation system of claim 21, wherein the MINT is configured to integrate business context from a domain registry including business unit domain identifiers, designations identifying use of data in production or non-production environments, and access level permissions, and wherein the enriched schema includes complete business context from domain metadata.

23. The intelligent data transformation system of claim 1, comprising a data quality service engine configured to:

perform automated balance control checks across multiple data zones including raw zones, conformed zones, and consumption zones;

validate record counts across zone boundaries during transformations;

perform aggregate balance verification including sums and averages across zone boundaries; and integrate balance control results with data lineage.

24. The intelligent data transformation system of claim 1, wherein the MINT is configured to perform multi-format analysis to infer a schema from metadata in formats including JavaScript Object Notation (JSON), Extensible Markup Language (XML), comma separated format (CSV), columnar storage format, JavaScript Object Notation Lines (JSONL), and spreadsheet formats.

25. The intelligent data transformation system of claim 1, wherein:

the user interface includes a plurality of DPX interfaces including a Web User Interface (UI) and a Command Line Interface (CLI) and the one or more APIs;

the one or more APIs include at least one Representational State Transfer (REST) API; and the plurality of DPX interfaces are configured to:

perform intelligent input analysis evaluating source type, generate Service Level Agreement (SLA) requirements, data volume estimates, security classification, and business attributes for automated processing decisions;

register the plural data source inputs using information about the at least one cloud object storage system including connection details, the one or more security credentials, and the one or more sample datasets;

verify an identity of a user using personally identifiable information (PII);

receive the schema inferred by the MINT; and enrich the metadata within the received schema.

26. The intelligent data transformation system of claim 1, wherein the pipeline orchestration engine is configured to:

manage directed acyclic graph lineage for job scheduling dependencies along the data pipeline; and interface, via the one or more APIs, with one or more development platforms to facilitate deployment and integration of the data pipeline by coordinating automatic code generation, testing, and production workflows.

27. The intelligent data transformation system of claim 1, wherein the homogenized data architecture configured to:

organize the flattened data into a storage database with functional zones including:

a raw zone for storing the flattened data in its original format and providing proper data segregation by business domain; and a conformed zone maintaining a homogenized, domain-aligned data structure preserving business context of the flattened data transformed from the raw zone;

transform, using a database transformation engine, the flattened data stored in the raw zone to the conformed zone, ensuring that transformations of flattened data between the raw zone and the conformed zone:

either execute completely or, if met with an error, are aborted;

maintain the integrity of the flattened data in accordance with governance policies;

are isolated, preventing a first transformation from interfering with a second transformation resulting in data inconsistencies in the conformed zone, and are permanent and robust to system outages and failures; and enforce security policies providing fine-grained access control, row level-security, and column-level masking.

28. A method for intelligent data transformation, the method comprising:

receiving, via a user interface including one or more application programming interfaces (APIs), plural data source inputs including one or more security credentials and one or more sample datasets;

managing, via the user interface, movement of the plural data source inputs;

coordinating data movement workflow from the plural data source inputs along a data pipeline using a pipeline orchestration engine located within a data production experience (DPX) core engine;

selecting a processing engine from a plurality of processing engines based on one or more characteristics of at least some data in the data pipeline characterizing a data source from which the at least some data was received, wherein selection of a processing engine is based at least in part on an intelligent data analysis;

interacting with the data pipeline using a metadata integration schema engine (MINT) to infer a data format of metadata when metadata is present in the data pipeline;

generating computer code that when executed will flatten input data received from the MINT via a data flattening platform to produce flattened data by identifying at least one or more parent-child relationships of hierarchical data structures within the input data using intelligent data transformation;

executing the computer code to produce the flattened data; and storing the flattened data in a homogenized data architecture accessible by the user interface.

29. The method for intelligent data transformation of claim 28, comprising:

performing, via the user interface, intelligent input analysis evaluating source type, Service Level Agreement (SLA) requirements, data volume estimates, security classification, and business attributes for automated processing decisions;

registering, via the user interface, the plural data source inputs using information including connection details, security credentials, and sample datasets;

verifying, via the user interface, an identity of a user using personally identifiable information (PII);

receiving, via the user interface, the schema inferred by the MINT; and enriching, via the user interface, the metadata within the received schema.

30. A non-transitory computer-readable medium storing computer-executable instructions that, when executed by one or more processors, cause the one or more processors to perform operations comprising:

receiving, via a user interface including one or more application programming interfaces (APIs), plural data source inputs including one or more security credentials and one or more sample datasets;

managing, via the user interface, movement of the plural data source inputs;

coordinating data movement workflow from the plural data source inputs along a data pipeline using a pipeline orchestration engine located within a data production experience (DPX) core engine;

selecting a processing engine from a plurality of processing engines based on one or more characteristics of at least some data in the data pipeline characterizing a data source from which the at least some data was received, wherein selection of a processing engine is based at least in part on an intelligent data analysis;

interacting with the data pipeline using a metadata integration schema engine (MINT) to infer a data format of metadata when metadata is present in the data pipeline;

generating computer code that when executed will flatten input data received from the MINT via a data flattening platform to produce flattened data by identifying at least one or more parent-child relationships of hierarchical data structures within the input data using intelligent data transformation;

executing the computer code to produce the flattened data; and storing the flattened data in a homogenized data architecture accessible by the user interface.

* * * * *